US009948966B1

(12) United States Patent
Panchaksharaiah et al.

(10) Patent No.: US 9,948,966 B1
(45) Date of Patent: Apr. 17, 2018

(54) SYSTEMS AND METHODS FOR MODIFYING PLAYBACK OF A MEDIA ASSET BASED ON AN EVENT THAT WILL INTERRUPT PLAYBACK OF THE MEDIA ASSET

(71) Applicant: Rovi Guides, Inc., San Carlos, CA (US)

(72) Inventors: Vishwas Sharadanagar Panchaksharaiah, Karnataka (IN); Vikram Makam Gupta, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/491,634

(22) Filed: Apr. 19, 2017

(51) Int. Cl.
| | |
|---|---|
| *H04N 21/262* | (2011.01) |
| *H04N 21/472* | (2011.01) |
| *H04N 21/462* | (2011.01) |
| *H04N 21/45* | (2011.01) |
| *H04N 21/6587* | (2011.01) |
| *H04N 21/466* | (2011.01) |

(52) U.S. Cl.
CPC ... *H04N 21/26283* (2013.01); *H04N 21/4524* (2013.01); *H04N 21/462* (2013.01); *H04N 21/4667* (2013.01); *H04N 21/47202* (2013.01); *H04N 21/6587* (2013.01)

(58) Field of Classification Search
CPC ......... H04N 21/26283; H04N 21/4524; H04N 21/462; H04N 21/4667
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 6,771,886 B1 * | 8/2004 | Mendelsohn | H04N 5/782 386/291 |
| 7,165,098 B1 | 1/2007 | Boyer et al. | |
| 7,761,892 B2 | 7/2010 | Ellis et al. | |
| 7,814,406 B2 * | 10/2010 | Ozawa | H04N 5/44543 715/202 |
| 8,046,801 B2 | 10/2011 | Ellis et al. | |
| 8,307,392 B2 | 11/2012 | Ahanger et al. | |
| 9,363,544 B2 | 6/2016 | Tomita | |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |

(Continued)

*Primary Examiner* — Sumaiya A Chowdhury
(74) *Attorney, Agent, or Firm* — Haley Guiliano LLP

(57) ABSTRACT

Systems and methods are disclosed herein for detecting that a given segment in a media asset currently being consumed will be interrupted by an event and, responsively, modifying playback of the media asset such that either the start time or the end time of the given segment coincides with the start time of the interrupting event. Modifying playback of the media asset to cause the end time of the given segment to coincide with the start time of the interrupting event may entail fast-forwarding through or removing one or more segments from the playback of the media asset. Modifying playback of the media asset to cause the start time of the given segment to coincide with the start time of the interrupting event may entail inserting one or more segments of secondary content into the playback of the media asset.

20 Claims, 11 Drawing Sheets

(56) References Cited

U.S. PATENT DOCUMENTS

| | | | |
|---|---|---|---|
| 2006/0123449 A1* | 6/2006 | Ma | G06K 9/222 |
| | | | 725/58 |
| 2010/0153885 A1 | 6/2010 | Yates | |
| 2016/0029085 A1* | 1/2016 | Mountain | H04N 21/4583 |
| | | | 725/43 |

* cited by examiner

100
Media Asset Playback Information

| Media Asset Playback Start Time | Media Asset Playback End Time |
|---|---|
| March 21, 2017, 08:00:00 AM | March 21, 2017, 09:00:00 AM |

102 ─ 104 ─   } 106

108
Interrupting Event Information

| Event Start Time | Time in the Media Asset that the Event Start Time Corresponds to |
|---|---|
| March 21, 2017, 08:45:00 AM | 00:45:00 |

110 ─ 112 ─   } 114

116
Media Asset Segment Information

| Segment ID | Segment Start Time | Segment End Time | |
|---|---|---|---|
| 1 | 00:00:00 | 00:01:59 | } 126 |
| 2 | 00:02:00 | 00:02:59 | } 128 |
| 3 | 00:03:00 | 00:04:59 | } 130 |
| 4 | 00:05:00 | 00:09:59 | } 132 |
| 5 | 00:10:00 | 00:11:59 | } 134 |
| 6 | 00:12:00 | 00:16:59 | } 136 |
| 7 | 00:17:00 | 00:26:59 | } 138 |
| 8 | 00:27:00 | 00:31:59 | } 140 |
| 9 | 00:32:00 | 00:41:59 | } 142 |
| 10 | 00:42:00 | 00:49:59 | } 144 |
| 11 | 00:50:00 | 00:52:59 | } 146 |
| 12 | 00:53:00 | 00:60:00 | } 148 |

FIG. 1

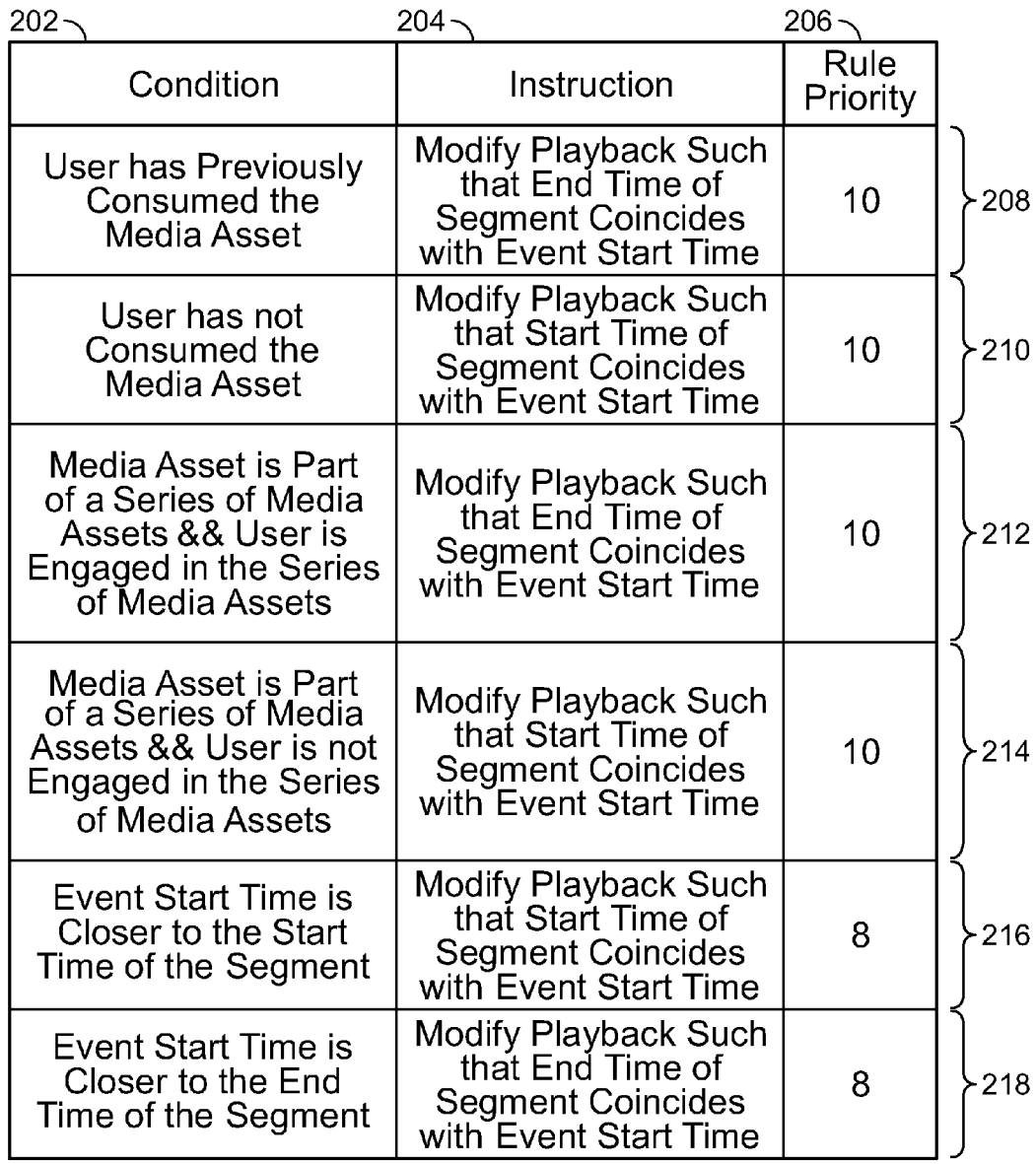

200

Playback Modification Scheme

| Condition | Instruction | Rule Priority | |
|---|---|---|---|
| User has Previously Consumed the Media Asset | Modify Playback Such that End Time of Segment Coincides with Event Start Time | 10 | 208 |
| User has not Consumed the Media Asset | Modify Playback Such that Start Time of Segment Coincides with Event Start Time | 10 | 210 |
| Media Asset is Part of a Series of Media Assets && User is Engaged in the Series of Media Assets | Modify Playback Such that End Time of Segment Coincides with Event Start Time | 10 | 212 |
| Media Asset is Part of a Series of Media Assets && User is not Engaged in the Series of Media Assets | Modify Playback Such that Start Time of Segment Coincides with Event Start Time | 10 | 214 |
| Event Start Time is Closer to the Start Time of the Segment | Modify Playback Such that Start Time of Segment Coincides with Event Start Time | 8 | 216 |
| Event Start Time is Closer to the End Time of the Segment | Modify Playback Such that End Time of Segment Coincides with Event Start Time | 8 | 218 |

FIG. 2

SYSTEMS AND METHODS FOR MODIFYING PLAYBACK OF A MEDIA ASSET BASED ON AN EVENT THAT WILL INTERRUPT PLAYBACK OF THE MEDIA ASSET

BACKGROUND

Currently available media systems may detect that a user will not finish watching a program before a certain time and recommend methods for adjusting the amount of time required to watch the full program. For example, currently available media systems may recommend fast-forwarding through the program, skipping to a next episode if the program is part of a series of programs or watching a program summary instead of watching the program itself. As a result, a user may miss watching significant portions of the program.

SUMMARY

In many cases, a user may prefer not to miss a portion of a media asset due to an interrupting event. For example, the user may prefer to stop consuming the media asset at a logical point within the media asset (e.g., beginning of a scene) instead. Current systems do not dynamically modify playback of a media asset based on an interrupting event such that start time of the interrupting event coincides with a logical point in the media asset. Therefore, systems and methods are disclosed herein for detecting that a given segment in media asset currently being consumed will be interrupted by an event and responsively, modifying playback of the media asset such that either the start time or the end time of the given segment coincides with the start time of the interrupting event. A media guidance application may identify a user consuming a media asset and detect that an event associated with the user is scheduled to occur during playback of the media asset. The media guidance application may determine, based on comparing the start time of the event with start times and end times of segments that make up the media asset, that the event will interrupt a given segment of the media asset. In response, the media guidance application may modify the playback of the media asset such that the occurrence event coincides with either the start time or the end time of the given segment.

In some aspects, the media guidance application may determine that a user is consuming a media asset, where the media asset includes a plurality of segments. The media guidance application may determine the identity of the user consuming the media asset based on a user identifier. A user identifier for a given user is a unique identifier associated with the given user such as a string of characters or biometric data (e.g., fingerprint, retina scan, voice recognition or another suitable biometric data). For example, the media guidance application may determine, based on user name "Sam Jackson" associated with a user equipment device on which the media asset is being consumed, that the user Sam Jackson is consuming the media asset. The media guidance application may determine an identifier for the media asset currently being consumed. For example, the media guidance application may determine, based on accessing a data structure (e.g., a playback summary data structure) associated with a media playback application currently executing on a user equipment device, an identifier for a media asset that the media playback application is currently presenting. The media asset identifier can be, but is not limited to, a media asset title, media asset serial code or any other suitable identifier. As an illustrative example, the media guidance application may determine that the media asset currently being consumed is "Captain America: The Winter Soldier." "Captain America: The Winter Soldier" may include multiple scenes.

The media guidance application may determine a start time and an end time associated with playback of the media asset. For example, the media guidance application may access a data structure (e.g., a playback summary data structure) associated with a media playback application currently playing back the media asset to retrieve a time stamp corresponding to a time when playback of the media asset was started and a time stamp corresponding to a time when the media asset playback is scheduled to end. Time stamp may be in the format "Month, Day, Year, Hour:Minute:Second." As an illustrative example, the media guidance application may determine that the start time and the end time associated with playback of "Captain America: The Winter Soldier" are Mar. 21, 2017, 08:00:00 AM and Mar. 21, 2017, 09:00:00 AM, respectively. In some embodiments, the media guidance application may retrieve a start time of a media asset and a duration of the media asset and compute the end time of the media asset based on the start time and the duration. As an illustrative example, the media guidance application may retrieve a start time of Mar. 21, 2017, 08:00:00 AM and duration of one hour for "Captain America: The Winter Soldier" and accordingly, compute an end time of Mar. 21, 2017, 09:00:00 AM. The media guidance application may retrieve, from a data structure associated with the user, an event associated with the user, where the event is scheduled for a first time that is between the start time and the end time associated with the playback of the media asset. For example, the media guidance application may access a calendar application associated with user Sam Jackson and query for any event scheduled between Mar. 21, 2017, 08:00:00 and Mar. 21, 2017, 09:00:00. As an illustrative example, the media guidance application may determine that Sam Jackson has a meeting scheduled to start on Mar. 21, 2017 at 08:45:00 AM.

In some embodiments, the media guidance application may determine, based on the start time of the interrupting event, a time within the media asset when the interrupting event will occur. Specifically, the media guidance application may calculate, based on the first time and the start time associated with the playback of the media asset, a second time, where the second time corresponds to a point in time within the media asset corresponding to the first time. Following from the example above, the media guidance application may calculate, based on playback start time of "Captain America: The Winter Soldier" (e.g., Mar. 21, 2017, 08:00:00) and the start time of Sam Jackson's meeting (e.g., Mar. 21, 2017 at 08:45:00 AM), that the start time of Sam Jackson's meeting corresponds to time stamp (00:45:00) within "Captain America: The Winter Soldier."

In some embodiments, the media guidance application may determine, based on comparing time within media asset when the interrupting event will occur with the start and end times of segments of the media asset, a segment of the media asset that will be interrupted by the event. Specifically, the media guidance application may compare the second time with a start time within the media asset of each segment of the plurality of segments and an end time within the media asset of each segment of the plurality of segments. As an illustrative example, "Captain America: The Winter Soldier" may include twelve segments (e.g., segments one through twelve, where number of a segment indicates the position of the segment in an ordered sequence of segments). For example, segment one may have a start time stamp of 00:00:00 and end time stamp of 00:04:59. For example, segment ten may have a start time stamp of 00:42:00 and end time stamp of 00:49:59. The media guidance application may execute a routine that receives the start time of a segment, end time of the segment and the second time as input variables and returns a Boolean result indicating whether the second time falls between the start time and the end time of the segment. The media guidance application may execute the routine iteratively until the media guidance application receives a "True" result, indicating that the second time falls between the start time and the end time of the segment, or until the media guidance application has checked all segments in the media asset. The media guidance application may determine that a given segment will be interrupted, where the given segment's start time precedes the second time and the given segment's end time follows the second time. As an illustrative example, the media guidance application may determine, based on receiving a "True" result from the routine for segment ten, that the start time stamp of segment ten (e.g., 00:42:00) precedes the second time (e.g., 00:45:00) and end time stamp of segment ten (e.g., 00:49:59) follows the second time (e.g., 00:45:00). Accordingly, the media guidance application may determine that segment ten will be interrupted.

The media guidance application may, in response to determining that a given segment will be interrupted by a pre-scheduled event, retrieve a rule that specifies how the playback of the media asset should be modified such that the occurrence of the pre-scheduled event coincides with either the start time or the end time of the given segment. The media guidance application may then modify the playback of the media asset in accordance to the instructions in the rule. Specifically, the media guidance application may, in response to determining that the given segment will be interrupted, retrieve a playback modification scheme for the media asset, where the playback modification scheme for the media asset specifies one or more rules that, when applied, cause one of the start time and the end time of the given segment to coincide with the first time. The playback modification scheme may be a table that contains one or more rule entries that specifies how playback of a media asset should be modified so that either the start time or the end time a segment that will be interrupted by an event coincides with the interrupting event start time. As an illustrative example, a rule entry in the playback modification scheme may specify that if a user has previously consumed the media asset, the playback of the media asset should be modified such that the end time of the given segment coincides with the start time of the event.

The media guidance application may apply a rule of the one or more rules to the playback of the media asset. For example, the media guidance application may determine, based on the media consumption history of the user, that the user has previously consumed "Captain America: The Winter Soldier". Accordingly, the media guidance application may apply the rule that specifies that if a user has previously consumed the media asset, modify the playback of the media asset such that the end time of the given segment coincides with the start time of the event. The media guidance application may, based on applying the rule of the one or more rules, modify the playback of the media asset to cause one of the start time and the end time of the given segment to coincide with the first time. In some embodiments, the media guidance application may change playback speed (e.g., fast forward) through a portion of a segment in the media asset to cause the end time of the given segment to coincide with the first time. A portion of a segment could be the entirety of the segment. Following from the example where segment ten of "Captain America: The Winter Soldier" will be interrupted by a pre-scheduled meeting, the media guidance application may determine, based on metadata associated with "Captain America: The Winter Soldier," that segment nine of "Captain America: The Winter Soldier" does not include much dialogue and is suitable for fast-forwarding through. For example, the media guidance application may determine, based on the second time (e.g., 00:45:00) and the end time of segment ten (e.g., 00:49:59), that the playback of segment ten has to be shifted back by four minutes and fifty-nine seconds for the end time of segment to coincide with the start time of the pre-scheduled meeting. The media guidance application may determine, based on metadata associated with "Captain America: The Winter Soldier," that segment nine has a duration of nine minutes and fifty-nine seconds and fast-forwarding through segment nine at twice the regular playback speed will result in segment ten being shifted back by approximately four minutes and fifty-nine seconds. Accordingly, the media guidance application may fast forward through segment nine at twice the regular playback speed so that the end time of segment ten coincides with the start time (e.g., Mar. 21, 2017 at 08:45:00 AM) of the pre-scheduled meeting.

In some embodiments, the media guidance application may remove a portion of a segment from the media asset to cause the end time of the given segment to coincide with the first time. A portion of a segment may be the entire segment. Following from the example where segment ten of "Captain America: The Winter Soldier" will be interrupted by a pre-scheduled meeting and where playback of segment ten has to be shifted back by four minutes and fifty-nine seconds for the end time of segment ten to coincide with the start time of the pre-scheduled meeting, the media guidance application may determine that segment six has a duration of four minutes and fifty-nine seconds. Accordingly, the media guidance application may remove segment six from the playback of "Captain America: The Winter Soldier" so that the end time of segment ten coincides with the start time (e.g., Mar. 21, 2017 at 08:45:00 AM) of the pre-scheduled meeting. In some embodiments, the media guidance application may insert secondary content into the playback of the media asset to cause the start time of the given segment to coincide with the first time. For example, the media guidance application may, upon determining that segment ten of "Captain America: The Winter Soldier" will be interrupted by a pre-scheduled meeting, determine, based on applying an appropriate rule from the playback modification scheme, that playback of segment ten should be shifted forward so that the start time of segment ten coincides with the pre-scheduled meeting start time. The media guidance application may determine, based on the second time (e.g., 00:45:00) and the start time of segment ten (e.g., 00:42:00), that the playback of segment ten has to be shifted forward by three minutes. Accordingly, the media guidance application may insert one or more advertisements with a total duration of three minutes into the playback of "Captain America: The Winter Soldier" at one or more points prior to position of segment ten within "Captain America: The Winter Soldier" so that the start time of segment ten coincides with the start time (e.g., Mar. 21, 2017 at 08:45:00 AM) of the pre-scheduled meeting.

In some embodiments, the user may be travelling to a destination while consuming a media asset and the media guidance application may determine that the user will arrive at the destination during presentation of a given scene in the media asset. Specifically, the media guidance application may, when retrieving the event associated with the user from the data structure associated with the user, determine, based on data retrieved from a navigation application, that the user is travelling to a destination while consuming the media asset. For example, the media guidance application may access a maps application (e.g., Google Maps™) on a device associated with the user and determine whether there is a route navigation that is currently active. For example, the media guidance application may determine, based on the data from the maps application, that the user is currently using the maps application to navigate from the user's home to the user's office. The media guidance application may retrieve, from the data retrieved from the navigation application, an arrival time, where the arrival time corresponds to a time when the destination will be reached. For example, the media guidance application may determine, based on route information retrieved from the maps application, the projected arrival time of the user at the office is Mar. 21, 2017, 08:45:00 AM.

The media guidance application may determine, based on comparing the arrival time with the start time and the end time associated with the playback of the media asset, that the arrival time is between the start time and the end time associated with the playback of the media asset. The media guidance application may set the arrival time as the first time. For example, the media guidance application may determine, based on receiving a "True" result from a routine that outputs whether a time is in between two other times, that the arrival time of Mar. 21, 2017, 08:45:00 AM is in between the start time (e.g., Mar. 21, 2017, 08:00:00) and the end time (e.g., Mar. 21, 2017, 09:00:00) associated with playback of "Captain America: The Winter Soldier." Accordingly, the media guidance application may set the value of the first time to Mar. 21, 2017, 08:45:00 AM.

In some embodiments, the media guidance application may determine that an activity that the user performs regularly on a given day and at a given time will interrupt a scene in the media asset currently being consumed. In some embodiments, the media guidance application may, when retrieving the event associated with the user from the data structure associated with the user, retrieve user activity data. As an illustrative example, the media guidance application may access a calendar application associated with the user to retrieve information about activities that the user has previously scheduled. The media guidance application may determine, based on the user activity data, whether there exists a habitual user activity associated with a specific time of day, where the habitual user activity corresponds to an activity that the user has performed at the specific time of day at least a threshold number of times within a pre-defined period of time. As an illustrative example, the media guidance application may determine, based on the information retrieved from the calendar application, that the user had scheduled a gym class every weekday at 08:45:00 AM for the last four weeks. The media guidance application may determine, based on accessing a calendar database, that that the current day (e.g., Mar. 21, 2017) is a weekday (e.g., Tuesday).

The media guidance application may, in response to determining that the habitual user activity exists, retrieve the specific time of day. For example, the media guidance application may retrieve the 08:45:00 AM start time associated with the habitual gym class. The media guidance application may determine, based on comparing the specific time of day with the start time and the end time associated with the playback of the media asset, that the specific time of day is between the start time and the end time associated with the playback of the media asset. The media guidance application may set the specific time of day as the first time. The media guidance application may determine, in manners discussed previously in relation to how the media guidance application may determine that the first time is between the start time and the end time associated with the playback of the media asset, that the 08:45:00 AM start time associated with the habitual gym class falls between the start time (e.g., Mar. 21, 2017, 08:00:00) and the end time (e.g., Mar. 21, 2017, 09:00:00) associated with playback of "Captain America: The Winter Soldier." Accordingly, the media guidance application may set the value of the first time to Mar. 21, 2017, 08:45:00 AM.

In some embodiments, the media guidance application may modify playback of a media asset based on whether the start time of the interrupting event is closer to the start time or the end time of the scene that will be interrupted. If the interrupting event is closer in time to the start point, the media guidance application may modify playback such that the start time of the scene matches the start time of the interrupting event. If the interrupting event is closer in time to the end point, the media guidance application may modify playback such that the end time of the scene matches the end time of the interrupting event. Specifically, the media guidance application may, when modifying the playback of the media asset based on applying the rule of the one or more rules, determine a first amount of time that corresponds to a difference between the start time of the given segment and the second time. The media guidance application may determine a second amount of time corresponding to a difference between the end time of the given segment and the second time.

The media guidance application may, in response to determining that the second amount of time exceeds the first amount of time, modify the playback of the media asset by inserting secondary content into the playback of the media asset such that the start time of the given segment coincides with the first time. As an illustrative example, the second time (i.e., time corresponding to the start time of the interrupting event within the media asset) may be 00:45:00. The segment being interrupted (e.g., segment ten of "Captain America: The Winter Soldier") may have a start time stamp of 00:42:00 and end time stamp of 00:49:59. The media guidance application may compute the first amount of time to be three minutes and the second amount of time to be four minutes and fifty-nine seconds. In response, the media guidance application may shift forward playback of segment ten by three minutes so that the start time of segment ten coincides with the interrupting event start time (e.g., Mar. 21, 2017 at 08:45:00 AM). The media guidance application may shift playback of segment ten forward by three minutes by inserting an advertisement with a duration of three minutes into the playback of "Captain America: The Winter Soldier" at a point prior to position of segment ten. In some embodiments, the media guidance application may insert multiple advertisements, that have a total duration of three minutes, into the playback of "Captain America: The Winter Soldier" to shift segment ten forward by three minutes.

In some embodiments, the media guidance application may determine that the interrupting event is closer in time to the end time of the scene that will be interrupted. In response, the media guidance application may shift the playback of the media asset backward by removing one or more scenes that are prior to the scene that will be interrupted, from the media asset. Specifically, the media guidance application may, in response to determining that the first amount of time exceeds the second amount of time, modify the playback of the media asset by removing one or more segments of the plurality of segments from the playback of the media asset such that the end time of the given segment coincides with the first time. As another illustrative example, the interrupting event start time may be Mar. 21, 2017 at 08:48:00 AM and the second time may be 00:48:00. Based on the start time stamp of 00:42:00 and end time stamp of 00:49:59 of the segment that will be interrupted (e.g., segment ten of "Captain America: The Winter Soldier") the media guidance application may compute the first amount of time to be six minutes and the second amount of time to be one minute and fifty-nine seconds. In response, the media guidance application may shift playback of segment ten backward by one minute and fifty-nine seconds such that the end time of segment coincides with the interrupting event start time (i.e., 08:48:00 AM). For example, the media guidance application may determine that segment one has a duration of one minute and fifty-nine seconds. Accordingly, the media guidance application may remove segment one from the playback of "Captain America: The Winter Soldier" so that the end time of the segment coincides with the start time (e.g., Mar. 21, 2017 at 08:48:00 AM) of the interrupting event.

In some embodiments, the media guidance application may, when selecting a segment to remove from playback of the media asset, use an importance score associated with a given segment to determine whether the given segment should be removed. Specifically, the media guidance application may retrieve an importance score associated with a first segment, where the importance score is an indicator of how important the first segment is to the media asset. As an illustrative example, the importance score may be a numerical value (e.g., five) on a pre-defined scale (e.g., scale ranging from zero to ten where zero corresponds to lowest possible importance and ten corresponds to highest possible importance). For example, segment one of "Captain America: The Winter Soldier" may be opening credits and may have an importance score of three. Segment three of "Captain America: The Winter Soldier" may be a scene that is very important to the plot of the movie and accordingly, segment three may be associated with an importance score of eight.

The media guidance application may retrieve a threshold importance score. For example, the media guidance application may access a data structure (e.g., a data structure for default parameters) to retrieve threshold importance score of five. The media guidance application may determine, based on comparing the importance score of the given segment with the threshold importance level, that the importance score of the first segment is less than the threshold importance score. For example, the media guidance application may execute a Boolean comparison function that returns a true result upon determining that a given importance score is greater than the threshold importance score. For example, the media guidance application may receive a "False" result when importance score of segment three (e.g., eight) is compared with the threshold importance score (e.g., five) and a "True" result when importance score of segment one (e.g., three) is compared with the threshold importance score (e.g., five). The media guidance application may, in response to determining that the importance score of the first segment is less than the threshold importance score, select the first segment for removal from the playback of the media asset. For example, the media guidance application may select segment one, but not segment three, for removal from the playback of "Captain America: The Winter Soldier."

In some embodiments, the media guidance application may, when removing segments from the media asset, remove segments with the lowest importance scores. For example, the media guidance application may filter segments in a media asset to determine a list of segments that have positions in the media asset that are prior to a position of the segment that will be interrupted (e.g., given segment) in the media asset. The media guidance application may determine a total duration by which the playback of the media asset has to be shifted back in time for the end time of the given segment to coincide with the start time of the interrupting event. The media guidance application may then sort the filtered list of segments based on importance scores associated with the segments in the list (e.g., sort according to ascending importance score). The media guidance application may select a segment with the lowest importance score from the sorted list for removal from the media asset. If the duration of the selected segment exceeds the total duration by which the playback of the media asset has to be shifted back, the media guidance application may only remove a portion of the selected segment, where duration of the portion matches the total duration by which the playback of the media asset has to be shifted back. If the duration of the selected segment is less than the total duration by which the playback of the media asset has to be shifted back, the media guidance application may add the selected segment to a list of segments for removal. The media guidance application may update the total duration by which the playback of the media asset has to be shifted back to be equal to the difference between the duration of the selected segment and the current value of the total duration by which the playback of the media asset has to be shifted back. The media guidance application may then select the next previously unselected segment on the sorted list with the lowest importance score and repeat the process. The media guidance application may iteratively perform the process until the duration by which playback of the media asset has to be shifted back equals zero. The media guidance application may then remove segments included in the list of segments for removal from the playback of the media asset.

In some embodiments, the media guidance application may modify the playback of media asset based on whether the user has previously consumed the media asset currently being consumed. If a user has previously consumed the media asset, the media guidance application may modify the playback such that the user consumes the entire scene before the interrupting event. If a user has not previously consumed the media asset, the media guidance application may modify the playback such that the scene occurs after the interrupting event. Specifically, the media guidance application may, when modifying the playback of the media asset based on applying the rule of the one or more rules, determine, based on the media consumption history of the user, whether the user has previously consumed the media asset. For example, the media guidance application may access the media consumption history associated with a user profile of the user.

The media consumption history may include information about media assets that the user has consumed, attributes of media assets that the user typically consumes (e.g., actor, director, genre, content rating and other suitable attributes), the user's media consumption habits (e.g., time of day when the user consumes media assets, user activity while consuming media asset and other suitable consumption habits) and other suitable information. As an illustrative example, the media consumption history data structure may include a list of media assets that the user has previously consumed. For example, the media guidance application may query the list of media assets that the user has previously consumed for a specific media asset in order to determine whether the user has previously consumed the specific media asset. For example, the media guidance application may query the list of media assets that the user has previously consumed to determine whether "Captain America: The Winter Soldier" is included in the list.

The media guidance application may, in response to determining that the user has previously consumed the media asset, modify the playback of the media asset such that the end time of the given segment coincides with the first time. Following from the previous example, the time within the media asset corresponding to the start time of the interrupting event (e.g., a pre-scheduled meeting) may be 00:45:00 and the segment that will be interrupted may be segment ten with a start time stamp of 00:42:00 and an end time stamp of 00:49:59. For example, the media guidance application may determine that "Captain America: The Winter Soldier" is included in the list of media assets that the user has previously consumed (e.g., upon receiving a positive result for the query). In response, the media guidance application may shift the playback of segment ten backward so that the end time of segment ten coincides with the start time of the interrupting event. For example, the media guidance application may remove segment six, which has a duration of four minutes and fifty-nine seconds, so that the playback of segment ten is shifted backward by four minutes and fifty-nine seconds, causing the end time of segment ten to coincide with the interrupting event start time of Mar. 21, 2017 at 08:45:00 AM.

The media guidance application may, in response to determining that the user has not previously consumed the media asset, modify the playback of the media asset such that the start time of the given segment coincides with the first time. For example, the media guidance application may determine that "Captain America: The Winter Soldier" is not included in the list of media assets that the user has previously consumed (e.g., upon receiving a null result for the query). In response, the media guidance application may insert advertisements into the playback of "Captain America: The Winter Soldier" to shift the playback of the segment ten forward by three minutes so that the start time of segment ten matches the start time of the interrupting event (e.g., Mar. 21, 2017 at 08:45:00 AM).

In some embodiments, where the media asset currently being consumed is part of a series of media assets, the media guidance application may modify the playback of the media asset currently being consumed based on whether the user is engaged with the series of media assets. Specifically, the media guidance application may, when modifying the playback of the media asset based on applying the rule of the one or more rules, determine that the media asset is part of a series of media assets. For example, the media guidance application may access metadata associated with the movie "Captain America: The Winter Soldier" and determine that it is part of a Captain America movie series that also includes movies "Captain America: The The First Avenger," "Captain America: Civil War," "The Avengers: Age of Ultron" and "The Avengers." The media guidance application may determine an indicator of engagement of the user in the series of media assets, where the indicator of engagement of the user in the series of media assets indicates whether the user is engaged with the series of media assets. The indicator of engagement may be a qualitative or quantitative indicator of a user's interest in a media asset. As an illustrative example, a qualitative indicator of a user's interest in a media asset may be fuzzy logic variables (e.g., "highly not engaged," "moderately engaged" and "highly engaged"). As an illustrative example, a quantitative indicator of a user's interest in a media asset may be may be a numerical value (e.g., five) on a pre-defined scale (e.g., a scale ranging from zero to ten where zero corresponds to no engagement and ten corresponds to maximum engagement). For example, the indicator of engagement may be a Boolean variable where a "true" value corresponds to a user being interested in the series of media assets and a "false" value corresponds to the user being not interested in the series of media assets.

In some embodiments, the media guidance application may determine whether a user is interested in a series of media assets based on a number of the media assets of the series of media assets that the user has consumed. The media guidance application may determine, based on the consumption history data of the user, a number of media assets of series of media assets that the user has previously consumed. For example, the media guidance application may query a list of media assets that the user has previously consumed for each media asset included in the series of media assets once and update a counter, initially initialized to zero, each time a positive query result is received. For example, the media guidance application may query the list of media assets that the user has previously consumed for media assets "Captain America: The First Avenger," "Captain America: Civil War," "The Avengers: Age of Ultron" and "The Avengers." The media guidance application may receive a positive query result only for media assets "Captain America: The First Avenger" and "The Avengers" and determine that the user has consumed two movies of the Captain America movie series.

The media guidance application may retrieve a threshold engagement number, where the threshold engagement number indicates a number of media assets within a series to be consumed by a given user in order for the given user to be classified as being engaged with the series of media assets. For example, the media guidance application may access a data structure for default parameters and retrieve a threshold engagement number of three. Based on the threshold engagement number of three, the media guidance application may determine that the user has to consume at least three media assets of a series of media assets for the user to be classified as being engaged in the series of media assets. The media guidance application may compare the threshold engagement number with the number of media assets of the series of media assets that the user has previously consumed. For example, the media guidance application may use a Boolean comparison function to determine whether the number of media assets of the series of media assets that the user has previously consumed is greater than the threshold engagement number.

The media guidance application may, in response to determining that the number of media assets of a series of media assets that the user has previously consumed exceeds the threshold engagement number, set the indicator of engagement of the user to indicate that the user is engaged with the series of media assets. For example, for the case where the user has consumed four movies of the Captain America movie series and the threshold engagement number is three, the media guidance application may set the value of the indicator of engagement variable to "true." The media guidance application may, in response to determining that the number of media assets of the series of media assets that the user has previously consumed is less than the threshold engagement number, set the indicator of engagement of the user to indicate that the user is not engaged with the series of media assets. For example, for the case where the user has consumed two movies of the Captain America movie series and the threshold engagement number is three, the media guidance application may set the value of the indicator of engagement variable to "false."

If the user is already interested in the series of media assets, the media consumption experience of the user may be more pleasant if the user is able to consume the given scene prior to the interrupting event. In this case, the media guidance application may modify playback of the media asset to present the complete scene before the interrupting event. Specifically, the media guidance application may, in response to determining, based on the indicator of engagement of the user in the series of media assets, that the user is engaged with the series of media assets, modify the playback of the media asset such that the end time of the given segment coincides with the first time. For example, the media guidance application may, upon determining that the value of the indicator of engagement variable for the Captain America movie series is "true," shift playback of "Captain America: The Winter Soldier" backward so that the end time of the segment that will be interrupted coincides with the start time of the interrupting event.

If the user is not already interested in the series of media assets, it may be preferable to modify playback of the current media asset such that the start time of a scene coincides with the start time of the interrupting event. This may engender, in the user, a curiosity regarding what happens in the scene and the user is more likely to resume viewing the media asset at a later point in time. In this case, the media guidance application may, in response to determining, based on the indicator of engagement of the user with the series of media assets, that the user is not engaged in the series of media assets, modify the playback of the media asset such that the start time of the given segment coincides with the first time. For example, the media guidance application may, upon determining that the value of the indicator of engagement variable for the Captain America movie series is "false," shift playback of "Captain America: The Winter Soldier" forward so that the start time of the segment that will be interrupted coincides with the start time of the interrupting event.

In some embodiments, there may be two different rules (e.g., first rule and second rule) that may be applied to modify playback of the media asset. Modifying the playback of the media asset based on rule one may yield a different result than modifying the playback of the media asset based on the second rule, resulting in a conflict. In this case, the media guidance application may resolve the conflict by applying the rule that is more important. Specifically, the media guidance application may, when applying the rule of the one or more rules to the playback of the media asset, determine that the playback modification scheme comprises a first rule and a second rule, where the first rule and the second rule if applied will create a conflict. For example, the playback modification may include a rule that if the user has previously consumed the media asset, playback of the media asset should be modified such that the end time of the given segment coincides with the event start time (first rule). The playback modification may also include a rule that if the event start time is closer to the start time of the given segment, playback of the media asset should be modified such that the start time of the given segment coincides with the event start time (second rule). In the event that the conditions for both the rules are fulfilled, there is a conflict because the first rule and second rule provide contradictory instructions regarding how playback should be modified.

The media guidance application may retrieve a first priority level associated with the first rule and a second priority level associated with the second rule. The media guidance application may determine that the first priority level is greater than the second priority level. The media guidance application may, in response to determining that the first priority level is greater than the second priority level, apply the first rule and refrain from applying the second rule. For example, the media guidance application may retrieve a priority level of ten for the first rule and priority level of eight for the second rule. The media guidance application may determine, based on executing a comparison function for comparing the two priority levels, that the first rule has the higher priority level. Accordingly, the media guidance application may apply the first rule, but not the second rule, to modify the playback of the media asset.

In some embodiments, the priority level assigned to a rule may be based on a condition that has to be fulfilled for the rule to apply. Specifically, the media guidance application may retrieve a first criterion associated with the first rule, and a second criterion associated with the second rule. For example, the media guidance application may determine that the condition that has to be fulfilled for the first rule to apply is that the user has previously consumed the media asset. The media guidance application may determine that the condition that has to be fulfilled for the second rule to apply is the event start time is closer to the start time of the given segment. The media guidance application may determine that the first criterion is related to the user, and the second criterion is related to the media asset. The media guidance application may assign the first priority to the first rule and the second priority to the second rule. For example, the media guidance application may determine that determining whether the user has previously consumed the media asset entails retrieving the user's media consumption history. Accordingly, the media guidance application may set the value of a "related to user" flag for the first rule to "true." The media guidance application may determine that determining whether the event start time is closer to the start time of the given segment entails retrieving the information associated with the media asset but not information associated with the user. Accordingly, the media guidance application may set the value of a "related to user" flag for the second rule to "false." The media guidance application may assign a priority level of ten to a rule (e.g., the first rule) that is associated with a true "related to user" flag and a priority level of eight to a rule (e.g., the second rule) that is associated with a false "related to user" flag.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows three data structures that the media guidance application may access when modifying playback of a media asset based on an event that will interrupt playback of a given segment within the media asset, in accordance with some embodiments of the disclosure;

FIG. 2 shows a data structure the media guidance application may access to retrieve a rule that specifies how playback of a media asset should be modified based on an event that will interrupt playback of a given segment within the media asset, in accordance with some embodiments of the disclosure;

DETAILED DESCRIPTION

Figure 3:
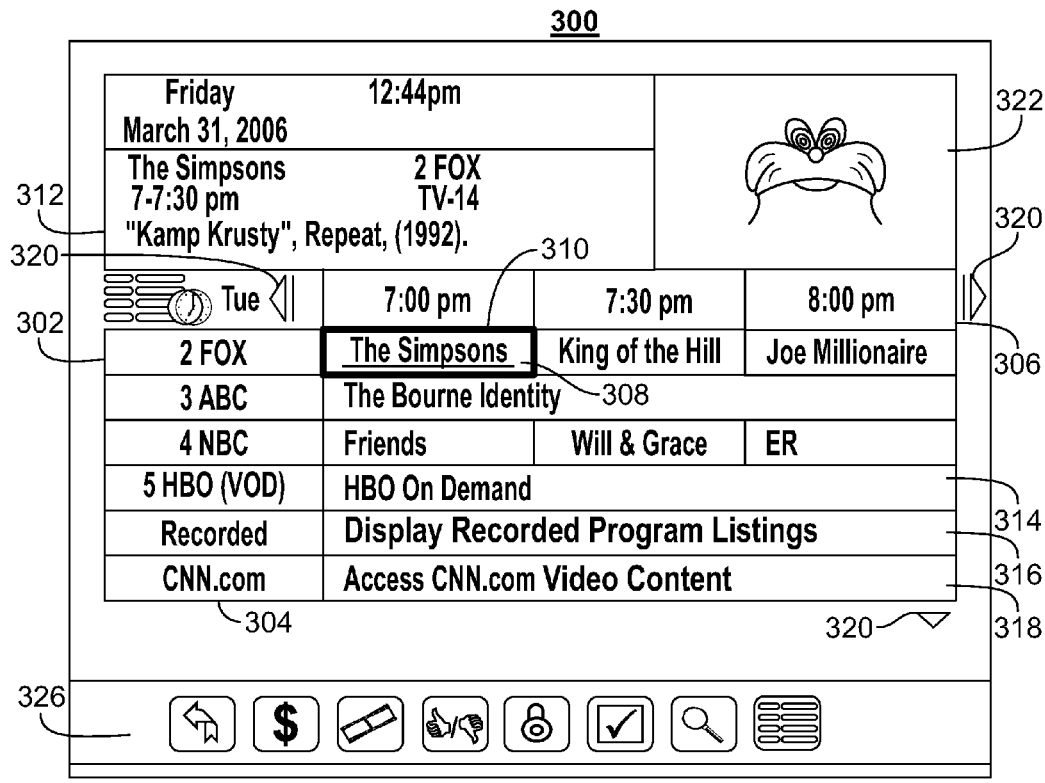
FIG. 3 shows an illustrative example of a display screen for use in accessing media content in accordance with some embodiments of the disclosure.

In some embodiments, the media guidance application is configured to determine that a given scene within a media asset will be interrupted by a pre-scheduled event. In response, the media guidance application may modify the playback of the media asset such that either the start point or the end point of the given scene coincides with the occurrence of the event.

Specifically, the described systems and methods may detect that a given segment in a media asset currently being consumed will be interrupted by an event and responsively, modify playback of the media asset such that either the start time or the end time of the given segment substantially coincides with the start time of the interrupting event. The media guidance application may identify a user consuming a media asset and detect that an event associated with the user is scheduled to occur during playback of the media asset. The media guidance application may determine, based on comparing the start time of the event with start times and end times of segments that make up the media asset, that the event interrupts a given segment of the media asset. In response, the media guidance application may modify the playback of the media asset such that the start time of the event coincides with either the start time or the end time of the given segment.

FIG. 1 shows three data structures that the media guidance application may use when modifying playback of a media asset based on an event that will interrupt playback of a given segment within the media asset. It should be noted that the data structures of FIG. 1 are used for illustrative purposes and other data structures may be used to illustrate the disclosed systems and methods. Specifically, information about media asset playback, interrupting event and segments of a media asset may be stored and categorized using other suitable data storage structures (e.g., linked lists, arrays) without departing from the scope of this disclosure.

The media guidance application may access data structure 100 for media asset playback information, data structure 108 for interrupting event information and data structure 116 for information of media asset segments. Data structure 100 may include one or more entries associated with playback of media assets. As an illustrative example, data structure 100 may include entry 106. Each entry in data structure 100 may include several fields that provide information about the playback start time and playback end time associated with a given media asset. Exemplary fields include, but are not limited to, media asset playback start time 102 and media asset playback end time 104. Data structure 108 may include one or more entries associated with event(s) that will interrupt playback of a media asset. As an illustrative example, data structure 108 may include entry 114. Each entry in data structure 100 may include several fields that provide information about the start time of the interrupting event and a time within the media asset that the start time of the interrupting event corresponds to. Exemplary fields include, but are not limited to, event start time 110 and a time within the media asset that the event start time corresponds to 114.

Data structure 116 may include one or more entries associated with segments of a given media asset. As an illustrative example, the data structure 116 may include entries 126, 128, 130, 132, 134, 136, 138, 140, 142, 144, 146, and 148. Each entry in data structure 116 may include several fields that provide information about the segment associated with the entry. Exemplary fields include but are not limited to segment ID 118, segment start time 120 and segment end time 122.

Segment ID 118 may be a unique or specific identifier associated with a segment or a pointer or link to the segment itself. In some embodiments, the media guidance application may generate data structure 116 and populate different fields of each entry (e.g., entries 126, 128, 130, 132, 134, 136, 138, 140, 142, 144, 146 and 148) based on information retrieved from metadata.

The media guidance application may access data structures 100, 108 and 116 when determining whether a given segment in a media asset will be interrupted by a pre-scheduled event, and responsively modify playback of the media asset. The media guidance application may determine that a user is consuming a media asset, where the media asset includes a plurality of segments. For example, the media guidance application may determine, based on information retrieved from a playback application currently executing on a user device, an identifier for a media asset that the media playback application is currently presenting. The media asset identifier can be, but is not limited to media asset title, media asset serial code or any other suitable identifier. As an illustrative example, the media guidance application may determine that the media asset currently being consumed is "Captain America: The Winter Soldier." The media guidance application may retrieve, from metadata associated with "Captain America: The Winter Soldier," an identifier (e.g., a pointer) for a data structure that includes more information about "Captain America: The Winter Soldier" (e.g., data structure 116). The media guidance application may access data structure 116 and, based on determining that data structure 116 includes multiple entries (e.g., entries 126, 128, 130, 132, 134, 136, 138, 140, 142, 144, 146, and 148), where each entry is associated with a unique segment of "Captain America: The Winter Soldier," the media guidance application may determine that Captain America: The Winter Soldier" includes multiple scenes. The media guidance application may determine the identity of the user consuming the media asset based on a user identifier. A user identifier for a given user may be a unique identifier associated with the given user such as a string of characters or biometric data (e.g., fingerprint, retinal scan, voice password or another suitable biometric identifier). For example, the media guidance application may determine, based on user name "Sam Jackson" associated with a user equipment device on which the media asset is being consumed, that the user Sam Jackson is consuming the media asset.

The media guidance application may determine a start time and an end time associated with playback of the media asset. For example, the media guidance application may access data structure 100, associated with playback of "Captain America: The Winter Soldier," to retrieve values corresponding to media asset playback start time 102 and media asset playback end time 104. Values corresponding to media asset playback start time 102 and media asset playback end time 104 may be in the format "Month, Day, Year, Hour:Minute:Second." As an illustrative example, the media guidance application may determine, based on retrieving values corresponding to media asset playback start time 102 and media asset playback end time 104 for an entry in data structure 100 associated with "Captain America: The Winter Soldier," that the start time and the end time associated with playback of "Captain America: The Winter Soldier" are Mar. 21, 2017, 08:00:00 AM and Mar. 21, 2017, 09:00:00 AM respectively.

The media guidance application may retrieve, from a data structure associated with the user, an event associated with the user, where the event is scheduled for a first time that is between the start time and the end time associated with the playback of the media asset. For example, the media guidance application may access a calendar application associated with user Sam Jackson and query for any event scheduled between Mar. 21, 2017, 08:00:00 and Mar. 21, 2017, 09:00:00. As an illustrative example, the calendar application may be a database of events and times associated with each of the events and the media guidance application may use database management languages (e.g., SQL, JAPQL, CODASYL or another suitable language) to perform the query. For example, the media guidance application may determine, based on the query results, that Sam Jackson has a meeting scheduled to start on Mar. 21, 2017 at 08:45:00 AM. The media guidance application may generate data structure 108 to store information about the determined interrupting event (e.g., the meeting). For example, the media guidance application may set the value corresponding to the event start time 110 to Mar. 21, 2017 at 08:45:00 AM.

In some embodiments, the media guidance application may determine, based on the start time of the interrupting event, a time within the media asset when the interrupting event will occur. Specifically, the media guidance application may calculate, based on the first time and the start time associated with the playback of the media asset, a second time, where the second time corresponds to a point in time within the media asset corresponding to the first time. Following from example above, the media guidance application may calculate, based on playback start time of "Captain America: The Winter Soldier" (e.g., Mar. 21, 2017, 08:00:00) and the start time of Sam Jackson's meeting (e.g., Mar. 21, 2017 at 08:45:00 AM), that the start time of Sam Jackson's meeting corresponds to time stamp (00:45:00) within "Captain America: The Winter Soldier." For example, the media guidance application may set the value corresponding to a time in the media asset that the event time corresponds to field 112 to 00:45:00.

In some embodiments, the media guidance application may determine, based on comparing the time within the media asset when the interrupting event will occur with the start and end times of segments of the media asset, a segment of the media asset that will be interrupted by the event. Specifically, the media guidance application may compare the second time with a start time within the media asset of each segment of the plurality of segments and an end time within the media asset of each segment of the plurality of segments. As an illustrative example, the media guidance application may determine, based on accessing data structure 116 associated with "Captain America: The Winter Soldier," that "Captain America: The Winter Soldier" includes twelve segments. For example, the media guidance application may determine, based on entry 126, that segment one has a start time stamp of 00:00:00 and an end time stamp of 00:04:59. For example, the media guidance application may determine, based on entry 144, that segment ten has a start time stamp of 00:42:00 and an end time stamp of 00:49:59. The media guidance application may execute a routine that receives the start time of a segment, the end time of the segment and the second time as input variables and returns a Boolean result indicating whether the second time falls between the start time and the end time of the segment. The media guidance application may iterate through entries until the media guidance application receives a "True" result, indicating that the second time falls between the start time and the end time of the segment, or until the media guidance application has checked all segments in the media asset.

The media guidance application may determine that a given segment will be interrupted, where the given segment's start time precedes the second time and the given segment's end time follows the second time. As an illustrative example, the media guidance application may determine, based on receiving a "True" result from the iteration for the routine for segment ten (entry 144), that the start time stamp of segment ten (e.g., 00:42:00) precedes the second time (e.g., 00:45:00) and the end time stamp of segment ten (e.g., 00:49:59) follows the second time (e.g., 00:45:00). Accordingly, the media guidance application may determine that segment ten will be interrupted. The media guidance application may, in response to determining that the given segment will be interrupted, retrieve a playback modification scheme for the media asset, where the playback modification scheme for the media asset specifies one or more rules that when applied cause one of the start time and the end time of the given segment to coincide with the first time. In some embodiments, instead of "coinciding" the times may substantially coincide. For example, if the start time/end time of a given segment is within some pre-defined range of the first time, the start time/end time is considered to have coincided with the first time.

The media guidance application, in response to determining that a given segment will be interrupted by a pre-scheduled event, may retrieve a rule that specifies how the playback of the media asset should be modified such that the occurrence of the pre-scheduled event coincides with either the start time or the end time of the given segment. The media guidance application may then modify the playback of the media asset in accordance with the instructions in the rule. Specifically, the media guidance application may, in response to determining that the given segment will be interrupted, retrieve a playback modification scheme for the media asset, where the playback modification scheme for the media asset specifies one or more rules that when applied cause one of the start time and the end time of the given segment to coincide with the first time. The media guidance application may apply a rule of the one or more rules to the playback of the media asset. The media guidance application may, based on applying the rule of the one or more rules, modify the playback of the media asset to cause one of the start time and the end time of the given segment to coincide with the first time.

FIG. 2 shows a data structure the media guidance application may access to retrieve a rule that specifies how playback of a media asset should be modified based on an event that will interrupt playback of a given segment within the media asset, in accordance with some embodiments of the disclosure. Although the depicted data structure may be used for storing rules for modifying playback of a media asset based on an interrupting event, other data structures may be used additionally or alternatively. Specifically, rules for modifying playback of a media asset may be stored and categorized using other suitable data storage structures (e.g., linked lists, arrays) without departing from the scope of this disclosure. The media guidance application may access playback modification scheme data structure 200 retrieving a rule to apply for modifying the playback of the media asset. Playback modification scheme data structure 200 may include one or more rule entries (e.g., rule entries 208, 210, 212, 214, 216 and 218) that specify how playback of a media asset should be modified so that either the start time or the end time of a segment that will be interrupted by an event coincides with the interrupting event start time. Each rule entry in playback modification scheme data structure 200 may include several fields. Exemplary fields include, but are not limited to, condition field 202, instruction field 204 and rule priority field 206. For a given rule entry, a value corresponding to condition field 202 may specify a condition that has to be fulfilled before the media guidance application can apply the given rule to modify playback of a media asset. For a given rule entry, a value corresponding to instruction field 204 may include instructions regarding how playback of a media asset should be modified when the given rule is applied. For a given rule entry, a value corresponding to rule priority field 206 may indicate an importance level of the given rule entry.

The media guidance application may apply a rule of the one or more rules to the playback of the media asset. For example, the media guidance application may determine that a condition for a rule entry (e.g., any of rule entries 208, 210, 212, 214, 216 and 218) in the playback modification scheme data structure 200 has been fulfilled and apply the playback modification instructions associated with the given rule to the playback of the media asset. The media guidance application may, by applying the rule of the one or more rules, modify the playback of the media asset to cause one of the start time and the end time of the given segment to coincide with the first time. In some embodiments, the media guidance application may change playback speed (e.g., fast forward) through a portion of a segment in the media asset to cause the end time of the given segment to coincide with the first time. A portion of a segment could be the entirety of the segment.

As an illustrative example, the media guidance application may retrieve, from playback modification scheme data structure 200, an additional instruction to fast-forward through segments with less dialogue (e.g., segments that are associated with true value corresponding to a "less dialogue" Boolean flag) when modifying the playback of a media asset. The media guidance application may retrieve the value of "less dialogue" Boolean flag associated with a segment when determining whether the segment is suitable for fast-forwarding through. Following from the example where segment ten of "Captain America: The Winter Soldier" will be interrupted by a pre-scheduled meeting, the media guidance application may determine, based on a true value corresponding to a "less dialogue" Boolean flag associated with segment nine of "Captain America: The Winter Soldier," that segment nine of "Captain America: The Winter Soldier" does not include much dialogue and is suitable for fast-forwarding through. The media guidance application may determine, based on the second time (e.g., 00:45:00 corresponding to the value of field 112 in entry 114) and the end time of segment ten (e.g., 00:49:59), that the playback of segment ten has to be shifted back by four minutes and fifty-nine seconds for the end time of the segment to coincide with the start time of the pre-scheduled meeting. The media guidance application may determine, based on metadata associated with "Captain America: The Winter Soldier," that segment nine has a duration of nine minutes and fifty-nine seconds and fast-forwarding through segment nine at twice the regular playback speed will result in segment ten being shifted back by approximately four minutes and fifty-nine seconds. Accordingly, the media guidance application may fast-forward through segment nine at twice the regular playback speed so that the end time of segment ten coincides with the start time (e.g., Mar. 21, 2017 at 08:45:00 AM) of the pre-scheduled meeting.

In some embodiments, the media guidance application may remove a portion of a segment from the media asset to cause the end time of the given segment to coincide with the first time. A portion of a segment may be the entire segment. Following from the example where segment ten of "Captain America: The Winter Soldier" will be interrupted by a pre-scheduled meeting and where playback of segment ten has to be shifted back by four minutes and fifty-nine seconds for the end time of segment ten to coincide with the start time of the pre-scheduled meeting, the media guidance application may determine, based on values for segment start time 120 and segment end time 122 associated with entry 136, that segment six has a duration of four minutes and fifty-nine seconds. Accordingly, the media guidance application may remove segment six from the playback of "Captain America: The Winter Soldier" so that the end time of segment ten coincides with the start time (e.g., Mar. 21, 2017 at 08:45:00 AM) of the pre-scheduled meeting.

In some embodiments, the media guidance application may insert secondary content into the playback of the media asset to cause the start time of the given segment to coincide with the first time. For example, the media guidance application may, upon determining that segment ten of "Captain America: The Winter Soldier" will be interrupted by a pre-scheduled meeting, determine, based on applying an appropriate rule from the playback modification scheme data structure 200, that playback of segment ten should be shifted forward so that the start time of segment ten coincides with the pre-scheduled meeting start time. The media guidance application may determine, based on the second time (e.g., 00:45:00) and the start time of segment ten (e.g., 00:42:00), that the playback of segment ten has to be shifted forward by three minutes. Accordingly, the media guidance application may insert one or more advertisements with a total duration of three minutes into the playback of "Captain America: The Winter Soldier" at one or more points prior to the position of segment ten so that the start time of segment ten coincides with the start time (e.g., Mar. 21, 2017 at 08:45:00 AM) of the pre-scheduled meeting. In some embodiments, the term "coincide" should be understood to include "substantially coincide" as well. For example, if the start time/end time of a given segment is within some pre-defined range of the first time, the start time/end time is considered to have coincided with the first time.

In some embodiments, the user may be travelling to a destination while consuming a media asset and the media guidance application may determine that the user will arrive at the destination during presentation of a given scene in the media asset. Specifically, the media guidance application may, when retrieving the event associated with the user from the data structure associated with the user, determine, based on data retrieved from a navigation application, that the user is travelling to a destination while consuming the media asset. For example, the media guidance application may access a user profile and retrieve one or more device identifiers for devices associated with the user. The media guidance application may query each of the devices to determine whether a maps application is currently executing on the device. Upon determining, based on receiving a positive acknowledgment for the query from a device, the media guidance application may retrieve information associated with the maps application executing on the device.

Specifically, the media guidance application may access a maps application (e.g., Google Maps™) on a device associated with the user and determine whether there is a route navigation that is currently active. For example, the media guidance application may determine, based on the data from the maps application, that the user is currently using the maps application to navigate from the user's home to the user's office. The media guidance application may retrieve, from the data retrieved from the navigation application, an arrival time, where the arrival time corresponds to a time when the destination will be reached. For example, the media guidance application may determine, based on route information retrieved from the maps application, the projected arrival time of the user at the office is Mar. 21, 2017, 08:45:00 AM.

The media guidance application may determine, based on comparing the arrival time with the start time and the end time associated with the playback of the media asset, that the arrival time is between the start time and the end time associated with the playback of the media asset. The media guidance application may set the arrival time as the first time. For example, the media guidance application may determine, based on receiving a "True" result from a routine that outputs whether a time is in between two other times, that the arrival time of Mar. 21, 2017, 08:45:00 AM is in between the start time (e.g., Mar. 21, 2017, 08:00:00) and the end time (e.g., Mar. 21, 2017, 09:00:00) associated with playback of "Captain America: The Winter Soldier." Accordingly, the media guidance application may set, for entry 114, the value corresponding to the field event start time 110 (i.e., the first time) to Mar. 21, 2017, 08:45:00 AM.

In some embodiments, the media guidance application may determine that an activity that the user performs regularly on a given day and at a given time will interrupt a scene in the media asset currently being consumed. In some embodiments, the media guidance application may, when retrieving the event associated with the user from the data structure associated with the user, retrieve user activity data. As an illustrative example, the media guidance application may access a calendar application associated with the user to retrieve information about activities that the user has previously scheduled. The media guidance application may determine, based on the user activity data, whether there exists a habitual user activity associated with a specific time of day, where the habitual user activity corresponds to an activity that the user has performed at the specific time of day at least a threshold number of times within a pre-defined period of time. An illustrative example of how the media guidance application may determine that a habitual user activity associated with a specific time of day exist is described below.

In some embodiments, the calendar application may include a calendar database. The media guidance application may filter the calendar database to determine a list of events that have occurred within the pre-defined time period (e.g., during the four weeks preceding the current date). The media guidance application may identify a plurality of unique events, within the filtered list, that are associated with at least a threshold number of entries in the database. For example, the media guidance application may use an appropriate database management language to query the filtered list for unique events that are associated with at least four distinct entries. For each unique event, the media guidance application may retrieve the event start times and determine if a threshold number of the event start times share a common attribute (e.g., same day of the week or substantially same time). For example, the media guidance application may determine that the gym class event has four distinct entries with start times (Mar. 14, 2017, 08:45:00 AM), (Mar. 7, 2017, 08:45:00 AM), (Apr. 28, 2017, 08:45:00 AM) and (Apr. 21, 2017, 08:45:00 AM).

In some embodiments, the media guidance application may generate a list of unique pairs of the four distinct entries (e.g., one unique pair may be Mar. 14, 2017, 08:45:00 AM and Mar. 7, 2017, 08:45:00 AM). The media guidance application may compare the start times (e.g., 08:45:00 AM and 08:45:00 AM) of the two entries in each unique pair to determine if there is a match. The media guidance application may increment a value of a "same start time" counter, initially initialized to zero, each time there is a match. Similarly, the media guidance application may compare the days (e.g., Tuesday and Tuesday) associated the two entries in each unique pair and increment a value of a "same day" counter, initially initialized to zero, each time there is a match. After the media guidance application has finished comparing the days and start times of all the unique pairs, the media guidance application may compare the value of "same day" counter and the value of "same day" counter with a threshold event repetition number, where the event repetition number indicates a number of times an event has to occur in a pre-defined time period for the event to be considered a habitual user activity. For example, the repetition number may be three. The media guidance application may determine, because both the value of "same day" counter and the value of "same day" counter for the gym class event exceed the threshold event repetition number, that a gym class at 08:45:00 AM on Tuesdays is a habitual user activity.

The media guidance application may, in response to determining that the habitual user activity exists, retrieve the specific time of day. For example, the media guidance application may retrieve an 08:45:00 AM start time associated with the habitual gym class. The media guidance application may determine, based on comparing the specific time of day with the start time and the end time associated with the playback of the media asset, that the specific time of day is between the start time and the end time associated with the playback of the media asset. The media guidance application may set the specific time of day as the first time.

The media guidance application may determine, in manners discussed previously in relation to how the media guidance application may determine that the first time is between the start time and the end time associated with the playback of the media asset, that the 08:45:00 AM start time associated with the habitual gym class falls between the start time (e.g., Mar. 21, 2017, 08:00:00) and the end time (e.g., Mar. 21, 2017, 09:00:00) associated with playback of "Captain America: The Winter Soldier." Accordingly, the media guidance application may set, for entry 114, the value corresponding to the field event start time 110 (i.e., the first time) to Mar. 21, 2017, 08:45:00 AM.

In some embodiments, the interrupting event may be an unscheduled event, such as receiving a user input to change the channel during playback of a segment in the media asset currently being consumed. In some embodiments, the media guidance application may determine an amount of time needed to complete playback of the segment currently being consumed. The media guidance application may determine whether the amount of time needed to complete playback of the segment currently being consumed is less than a threshold time (e.g., retrieved from a data structure for threshold parameters). The media guidance application, upon determining that the amount of time needed to complete playback of the segment currently being consumed is less than a threshold time, may display notification to the user, recommending that the user wait until for the amount of time needed to complete playback of the segment currently being consumed before changing the channel. In some embodiments, the media guidance application may automatically refrain from changing the channel for the amount of time needed to complete playback of the segment. The media guidance application, upon determining that the amount of time needed to complete playback of the segment currently being consumed is greater than the threshold time, may change the channel.

In some embodiments, the media guidance application may, upon receiving a request to change channels, retrieve playback information for a media asset (e.g., new media asset) currently being presented on the requested channel. The media guidance application may determine, based on start times and end times of segments of the new media asset and a current time, whether the current progress point in the new media asset is in between a given segment of the new media asset. In response to determining that the current progress point is in between a given segment of the new media asset, the media guidance application may determine a start time of the next segment in the new media asset. The media guidance application may compute a time interval between the current time and the start time of the next segment in the new media asset. The media guidance application may then display a notification to the user that suggests that the user wait for the computed time interval before switching to the requested channel.

In some embodiments, the media guidance application may modify playback of a media asset based on whether the start time of the interrupting event is closer to the start time or the end time of the scene that will be interrupted. If the interrupting event is closer to the start point, the media guidance application may modify playback such that the start time of the scene matches the start time of the interrupting event. If the interrupting event is closer to the end point, the media guidance application may modify playback such that the end time of the scene matches the end time of the interrupting event. Specifically, the media guidance application may, when modifying the playback of the media asset based on applying the rule of the one or more rules, determine a first amount of time that corresponds to a difference between the start time of the given segment and the second time. The media guidance application may determine a second amount of time corresponding to a difference between the end time of the given segment and the second time.

The media guidance application may, in response to determining that the second amount of time exceeds the first amount of time, modify the playback of the media asset by inserting secondary content into the playback of the media asset such that the start time of the given segment coincides with the first time. As an illustrative example, the second time (i.e., time corresponding to the start time of the interrupting event within the media asset) may be 00:45:00. The segment being interrupted (e.g., segment ten of "Captain America: The Winter Soldier") may have a start time stamp of 00:42:00 and an end time stamp of 00:49:59. The media guidance application may compute the first amount of time to be three minutes and the second amount of time to be four minutes and fifty-nine seconds. In response, the media guidance application may shift forward playback of segment ten by three minutes so that the start time of segment ten coincides with the interrupting event start time (e.g., Mar. 21, 2017 at 08:45:00 AM). The media guidance application may shift playback of segment ten forward by three minutes by inserting an advertisement with a duration of three minutes into the playback of "Captain America: The Winter Soldier" at a point prior to the position of segment ten. In some embodiments, the media guidance application may insert multiple advertisements, that have a total duration of three minutes, into the playback of "Captain America: The Winter Soldier" in order to shift segment ten forward by three minutes.

The media guidance application may, in response to determining that the first amount of time exceeds the second amount of time, modify the playback of the media asset by removing one or more segments of the plurality of segments from the playback of the media asset such that the end time of the given segment coincides with the first time. As another illustrative example, the interrupting event start time may be Mar. 21, 2017 at 08:48:00 AM and the second time may be 00:48:00. Based on the start time stamp of 00:42:00 and end time stamp of 00:49:59 of the segment that will be interrupted (e.g., segment ten of "Captain America: The Winter Soldier") the media guidance application may compute the first amount of time to be six minutes and the second amount of time to be one minute and fifty-nine seconds. In response, the media guidance application may shift playback of segment ten backward by one minute and fifty-nine seconds such that the end time of segment coincides with the interrupting event start time (i.e., 08:48:00 AM). For example, the media guidance application may determine, based on data structure 116, that segment one has a duration of one minute and fifty-nine seconds. Accordingly, the media guidance application may remove segment one from the playback of "Captain America: The Winter Soldier" so that the end time of the segment coincides with the start time (e.g., Mar. 21, 2017 at 08:48:00 AM) of the interrupting event.

In some embodiments, the media guidance application may, when selecting a segment to remove from playback of the media asset, use an importance score associated with a given segment to determine whether the given segment should be removed.

Specifically, the media guidance application may retrieve an importance score associated with a first segment, where the importance score is an indicator of how important the first segment is to the media asset. In some embodiments, the importance score may be fuzzy logic variables such as "very important," "moderately important" and "not important." As an illustrative example, the importance score may be a numerical value (e.g., five) on a pre-defined scale (e.g., a scale ranging from zero to ten where zero corresponds to lowest possible importance and ten corresponds to highest possible importance). In some embodiments, data structure 116 may include an importance score field (not shown) and the media guidance application may retrieve the importance score from data structure 116. For example, segment one of "Captain America: The Winter Soldier" may be opening credits and may have an importance score of three. Segment three of "Captain America: The Winter Soldier" may be a scene that is very important to the plot of the movie and, accordingly, segment three may be associated with an importance score of eight.

The media guidance application may retrieve a threshold importance score. For example, the media guidance application may access a data structure (e.g., a data structure for default parameters located at any of storage 508, media content source 616 and media guidance data source 618) to retrieve a threshold importance score of five. The media guidance application may determine, based on comparing the importance score of the given segment with the threshold importance level, that the importance score of the first segment is less than the threshold importance score. For example, the media guidance application may execute a Boolean comparison function that returns a true result upon determining that a given importance score is greater than the threshold importance score. For example, the media guidance application may receive a "False" result when an importance score of segment three (e.g., eight) is compared with the threshold importance score (e.g., five) and a "True" result when an importance score of segment one (e.g., three) is compared with the threshold importance score (e.g., five). The media guidance application may, in response to determining that the importance score of the first segment is less than the threshold importance score, select the first segment for removal from the playback of the media asset. For example, the media guidance application may select segment one, but not segment three, for removal from the playback of "Captain America: The Winter Soldier."

In some embodiments, the media guidance application may modify the playback of a media asset based on whether the user has previously consumed the media asset currently being consumed. If a user has previously consumed the media asset, the media guidance application may modify the playback such that the user consumes the entire scene before the interrupting event. If a user has not previously consumed the media asset, the media guidance application may modify the playback such that the scene occurs after the interrupting event. Specifically, the media guidance application may, when modifying the playback of the media asset based on applying the rule of the one or more rules, determine, based on the media consumption history of the user, whether the user has previously consumed the media asset. For example, the media guidance application may access a media consumption history data structure associated with a user profile of the user. The media consumption history data structure may include information about media assets that the user has consumed, attributes of media assets that the user typically consumes (e.g., actor, director, genre, content rating and other suitable attributes), the user's media consumption habits (e.g., time of day when the user consumes media assets, user activity while consuming media asset and other suitable consumption habits) and other suitable information.

As an illustrative example, the media consumption history data structure may include a list of media assets that the user has previously consumed. For example, the media guidance application may query the list of media assets that the user has previously consumed for a specific media asset in order to determine whether the user has previously consumed the specific media asset. For example, the media guidance application may query the list of media assets that the user has previously consumed to determine whether "Captain America: The Winter Soldier" is included in the list.

The media guidance application may, in response to determining that the user has previously consumed the media asset, modify the playback of the media asset such that the end time of the given segment coincides with the first time. Following from the previous example, the time within the media asset corresponding to the start time of the interrupting event (e.g., a pre-scheduled meeting) may be 00:45:00 and the segment that will be interrupted may be segment ten with a start time stamp of 00:42:00 and an end time stamp of 00:49:59. For example, the media guidance application may determine that "Captain America: The Winter Soldier" is included in the list of media assets that the user has previously consumed (e.g., upon receiving a positive result for the query). In response, the media guidance application may shift the playback of segment ten backward so that the end time of segment ten coincides with the start time of the interrupting event. For example, the media guidance application may remove segment six, which has a duration of four minutes and fifty-nine seconds, so that the playback of segment ten is shifted backward by four minutes and fifty-nine seconds, causing the end time of segment ten to coincide with the interrupting event start time of Mar. 21, 2017 at 08:45:00 AM.

The media guidance application may, in response to determining that the user has not previously consumed the media asset, modify the playback of the media asset such that the start time of the given segment coincides with the first time. For example, the media guidance application may determine that "Captain America: The Winter Soldier" is not included in the list of media assets that the user has previously consumed (e.g., upon receiving a null result for the query). In response, the media guidance application may insert advertisements into the playback of "Captain America: The Winter Soldier" to shift the playback of the segment ten forward by three minutes so that the start time of segment ten matches the start time of the interrupting event (e.g., Mar. 21, 2017 at 08:45:00 AM).

In some embodiments, where the media asset being currently being consumed is part of a series of media assets, the media guidance application may modify the playback of the media asset currently being consumed based on whether the user is engaged in the series of media assets. Specifically, the media guidance application may, when modifying the playback of the media asset based on applying the rule of the one or more rules, determine that the media asset is part of a series of media assets. For example, the media guidance application may access metadata associated with the movie "Captain America: The Winter Soldier" and determine that it is part of a Captain America movie series that also includes movies "Captain America: The First Avenger," "Captain America: Civil War," "The Avengers: Age of Ultron" and "The Avengers." The media guidance application may determine an indicator of engagement of the user in the series of media assets, where the indicator of engagement of the user in the series of media assets indicates whether the user is engaged with the series of media assets.

The indicator of engagement may be a qualitative or quantitative indicator of a user's interest in a media asset. For example, a qualitative indicator of engagement may be fuzzy logic variables such as "highly not engaged," "moderately engaged" and "highly engaged." The indicator of engagement may be a numerical value (e.g., five) on a pre-defined scale (e.g., scale ranging from zero to ten where zero corresponds to no engagement and ten corresponds to maximum engagement). For example, the indicator of engagement may be a Boolean variable where a "true" value corresponds to a user being interested in the series of media assets and a "false" value corresponds to the user being not interested in the series of media assets.

In some embodiments, the media guidance application may determine whether a user is interested in a series of media assets based on a number of the media assets of the series of media assets that the user has consumed. The media guidance application may determine, based on the consumption history data of the user, a number of media assets of series of media assets that the user has previously consumed. For example, the media guidance application may query a list of media assets that the user has previously consumed for each media asset included in the series of media assets once and update a counter, initially initialized to zero, each time a positive query result is received. For example, the media guidance application may query the list of media assets that the user has previously consumed for media assets "Captain America: The First Avenger," "Captain America: Civil War," "The Avengers: Age of Ultron" and "The Avengers." The media guidance application may receive a positive query result only for media assets "Captain America: The First Avenger" and "The Avengers" and determine that the user has consumed two movies of the Captain America movie series.

The media guidance application may retrieve a threshold engagement number, where the threshold engagement number indicates a number of media assets within a series to be consumed by a given user in order for the given user to be classified as being engaged with the series of media assets. For example, the media guidance application may access a data structure for default parameters and retrieve a threshold engagement number of three. Based on the threshold engagement number of three, the media guidance application may determine that the user has to consume at least three media assets of a series of media assets for the user to be classified as being engaged in the series of media assets. The media guidance application may compare the threshold engagement number with the number of media assets of the series of media assets that the user has previously consumed. For example, the media guidance application may use a Boolean comparison function to determine whether the number of media assets of the series of media assets that the user has previously consumed is greater than the threshold engagement number.

The media guidance application may, in response to determining that the number of media assets of series of media assets that the user has previously consumed exceeds the threshold engagement number, set the indicator of engagement of the user to indicate that the user is engaged with the series of media assets. For example, for the case where the user has consumed four movies of the Captain America movie series and the threshold engagement number is three, the media guidance application may set the value of the indicator of engagement variable to "true." The media guidance application may, in response to determining that the number of media assets of the series of media assets that the user has previously consumed is less than the threshold engagement number, set the indicator of engagement of the user to indicate that the user is not engaged with the series of media assets. For example, for the case where the user has consumed two movies of the Captain America movie series and the threshold engagement number is three, the media guidance application may set the value of the indicator of the engagement variable to "false."

If the user is already interested in the series of media assets, the media consumption experience of the user may be more pleasant if the user is able to consume the given scene prior to the interrupting event. In this case, the media guidance application may modify playback of the media asset to present the complete scene before the interrupting event. Specifically, the media guidance application may, in response to determining, based on the indicator of engagement of the user in the series of media assets, that the user is engaged with the series of media assets, modify the playback of the media asset such that the end time of the given segment coincides with the first time. For example, the media guidance application may, upon determining that the value of the indicator of engagement variable for the Captain America movie series is "true," shift playback of "Captain America: The Winter Soldier" backward so that the end time of the segment that will be interrupted coincides with the start time of the interrupting event.

If the user is not already interested in the series of media assets, it may be preferable to modify playback of the current media asset such that the start time of a scene coincides with the start time of the interrupting event. This may engender, in the user, a curiosity regarding what happens in the scene, and the user is more likely to resume viewing the media asset at a later point in time. In this case, the media guidance application may, in response to determining, based on the indicator of engagement of the user with the series of media assets, that the user is not engaged in the series of media assets, modify the playback of the media asset such that the start time of the given segment coincides with the first time. For example, the media guidance application may, upon determining that the value of the indicator of engagement variable for the Captain America movie series is "false," shift playback of "Captain America: The Winter Soldier" forward so that the start time of the segment that will be interrupted coincides with the start time of the interrupting event.

In some embodiments, there may be two different rules (e.g., a first rule and a second rule) that may be applied to modify playback of the media asset. Modifying the playback of the media asset based on the first rule may yield a different result than modifying the playback of the media asset based on the second rule, resulting in a conflict. In this case, the media guidance application may resolve the conflict by applying the rule that is more important. Specifically, the media guidance application may, when applying the rule of the one or more rules to the playback of the media asset, determine that the playback modification scheme comprises a first rule and a second rule, where the first rule and the second rule if applied will create a conflict. For example, playback modification scheme 200 may include rule entry 208, where value of condition field 202 is "user has previously consumed the media asset" and value of instruction field 204 is "modify playback of the media asset such that end time of the given segment coincides with the event start time." Playback modification scheme 200 may also include rule entry 216, where value of condition field 202 is "event start time is closer to the start time of the given segment" and value of instruction field 204 is "modify playback of the media asset such that start time of the given segment coincides with the event start time." In the event that the conditions for both the rules are fulfilled, there is a conflict because rule entry 208 and rule entry 216 provide contradictory instructions regarding how playback should be modified.

The media guidance application may retrieve a first priority level associated with the first rule and a second priority level associated with the second rule. The media guidance application may determine that the first priority level is greater than the second priority level. The media guidance application may, in response to determining that the first priority level is greater than the second priority level, apply the first rule and refrain from applying the second rule. For example, the media guidance application may retrieve a priority level of ten for rule entry 208 and a priority level of eight for rule entry 216. The media guidance application may determine, based on executing a comparison function for comparing the two priority levels, that rule entry 208 has the higher priority level. Accordingly, the media guidance application may apply rule entry 208, but not rule entry 216, to modify the playback of the media asset.

In some embodiments, the priority level assigned to a rule may be based on a condition that has to be fulfilled for the rule to apply. Specifically, the media guidance application may retrieve a first criterion associated with the first rule, and a second criterion associated with the second rule. For example, the media guidance application may determine that the condition that has to be fulfilled for rule entry 208 to apply is that the user has previously consumed the media asset. The media guidance application may determine that the condition that has to be fulfilled for rule entry 216 to apply is that the event start time is closer to the start time of the given segment. The media guidance application may determine that the first criterion is related to the user, and the second criterion is related to the media asset. The media guidance application may assign the first priority to the first rule and the second priority to the second rule. For example, the media guidance application may determine that determining whether the user has previously consumed the media asset entails retrieving the user's media consumption history. Accordingly, the media guidance application may set the value of a "related to user" flag for the first rule to "true." The media guidance application may determine that determining whether the event start time is closer to the start time of the given segment entails retrieving the information associated with the media asset but not information associated with the user. Accordingly, the media guidance application may set the value of a "related to user" flag for the second rule to "false." The media guidance application may assign a priority level of ten to a rule (e.g., the first rule) that is associated with a true "related to user" flag and a priority level eight to a rule (e.g., the second rule) that is associated with a false "related to user" flag.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 4:
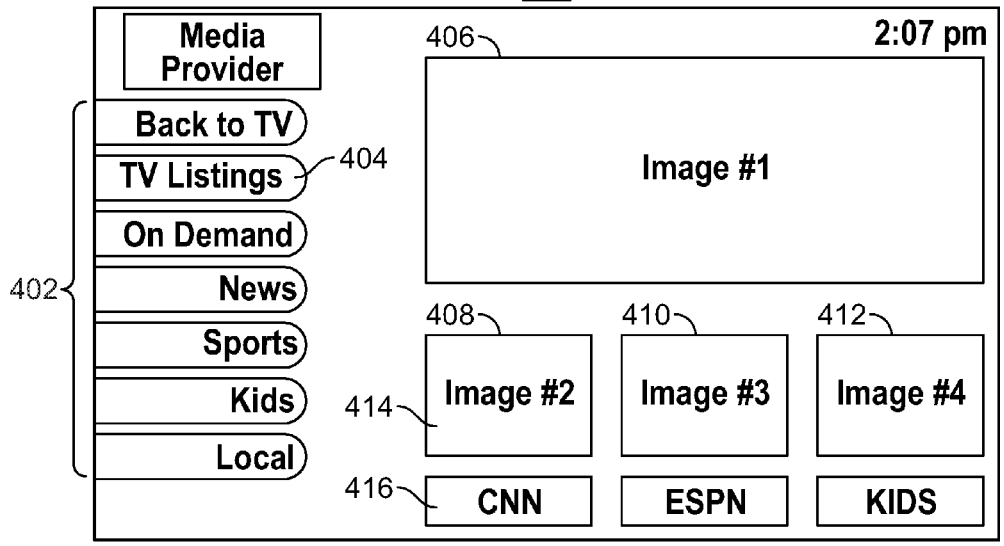
FIG. 4 shows yet another illustrative example of a display screen for use in accessing media content in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, advertisement 324, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 324 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 302. Advertisement 324 may also be for products or services related or unrelated to the content displayed in grid 302. Advertisement 324 may be selectable and provide further information about content, provide information about a product or a service, enable purchasing of content, a product, or a service, provide content relating to the advertisement, etc. Advertisement 324 may be targeted based on a user's profile/preferences, monitored user activity, the type of display provided, or on other suitable targeted advertisement bases.

While advertisement 324 is shown as rectangular or banner shaped, advertisements may be provided in any suitable size, shape, and location in a guidance application display. For example, advertisement 324 may be provided as a rectangular shape that is horizontally adjacent to grid 302. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
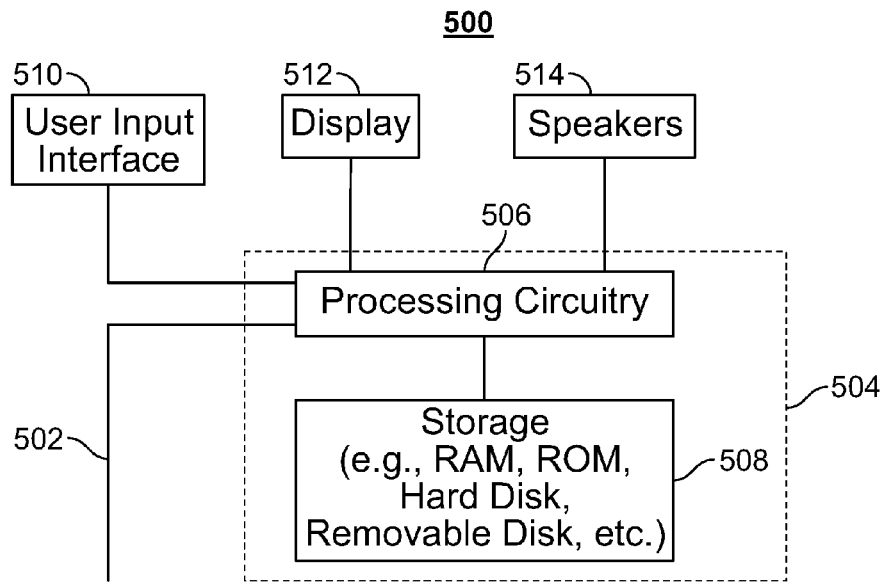
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D.

A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
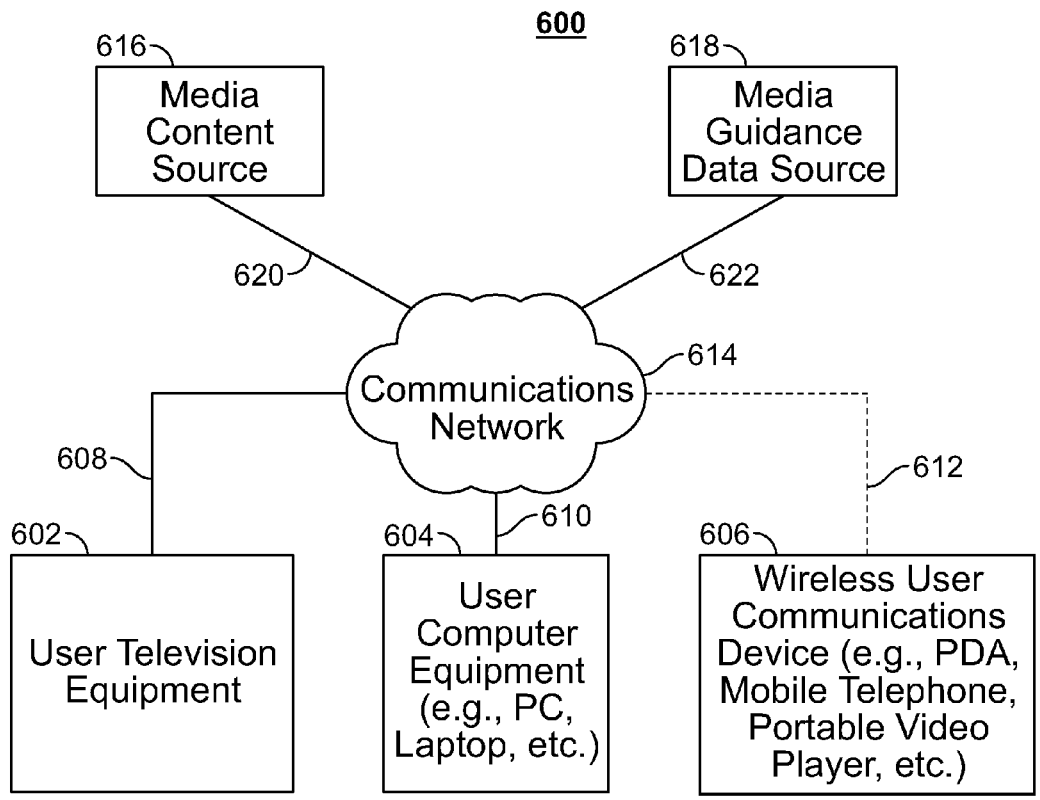
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some user television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, and wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic communications paths, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

The media guidance application may reside on user television equipment 602 (FIG. 6), user computer equipment 604 (FIG. 6), and/or wireless user communications device 606 (FIG. 6). In some embodiments, some or all portions of the media guidance application may be located at media content source 616 (FIG. 6) and/or media guidance data source 618 (FIG. 6). In some embodiments, portions of the media guidance application may be located on each of user television equipment 602 (FIG. 6), user computer equipment 604 (FIG. 6), wireless user communications device 606 (FIG. 6), media content source 616 (FIG. 6) and media guidance data source 618 (FIG. 6).

Figure 7:
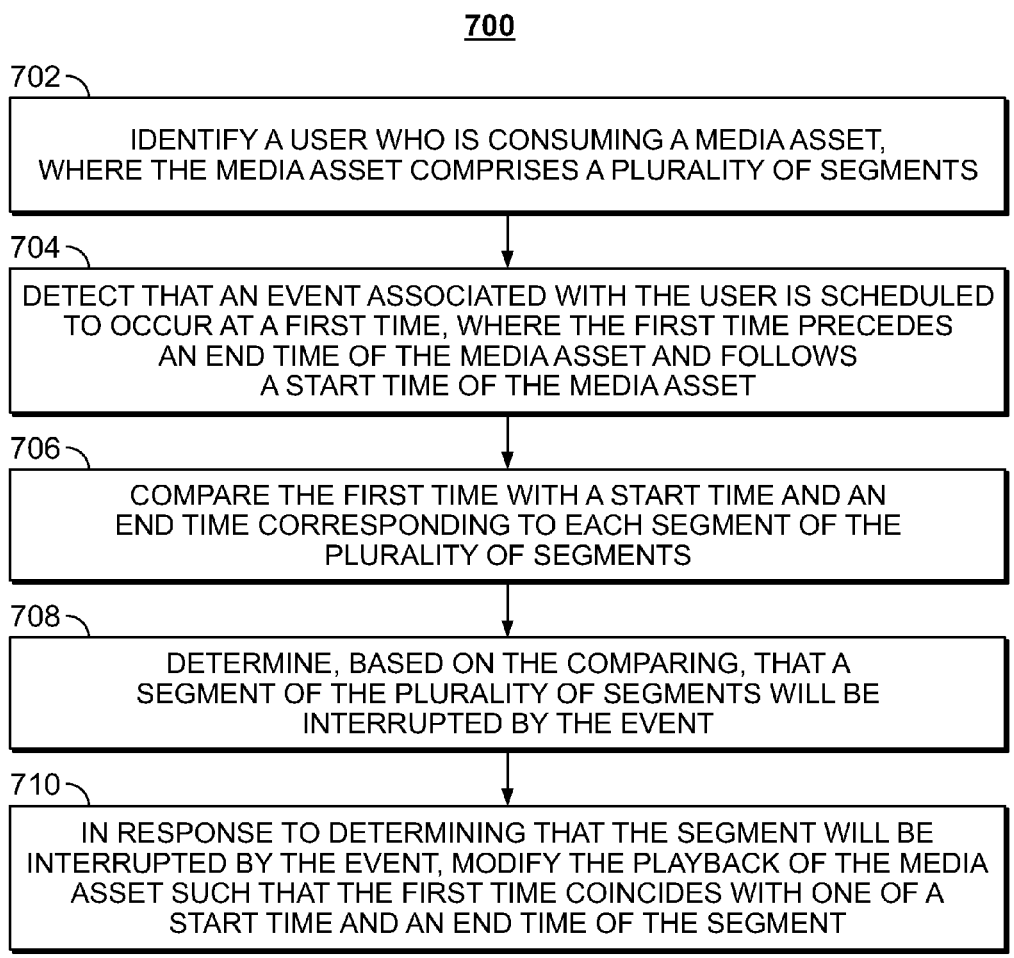
FIG. 7 is a flowchart of illustrative steps involved in modifying playback of a media asset based on an event that will interrupt playback of a given segment within the media asset, in accordance with some embodiments of the disclosure.

FIG. 7 is a flowchart of illustrative steps involved in modifying playback of a media asset based on an event that will interrupt playback of a given segment within the media asset, in accordance with some embodiments of the disclosure. Process 700 may be executed by control circuitry 504 (FIG. 5) as instructed by the media guidance application. Control circuitry 504 may be implemented on user equipment 602, 604, and/or 606 (FIG. 6). In addition, one or more actions of process 700 may be incorporated into or combined with one or more actions of any other process or embodiment.

Process 700 begins at 702 where control circuitry 504 identifies a user who is consuming a media asset, where the media asset comprises a plurality of segments. Control circuitry 504 may determine the identity of the user consuming the media asset based on a user identifier. Control circuitry 504 may receive the user identifier via user input interface 510. Alternatively or additionally, control circuitry 504 may retrieve the user identifier associated with a user equipment device on which the media asset is being consumed from any of storage 408, media content source 616 and media guidance data source 618. For example, control circuitry 504 may determine, based on user name "Sam Jackson," that the user Sam Jackson is consuming the movie "Captain America: The Winter Soldier." Process 700 continues to 704 where control circuitry 504 detects that an event associated with the user is scheduled to occur at a first time, where the first time precedes an end time of the media asset and follows a start time of the media asset. For example, control circuitry 504 may retrieve from data structure 100 playback start time (e.g., Mar. 21, 2017, 08:00:00 AM) and playback end time (e.g., Mar. 21, 2017, 08:00:00) for "Captain America: The Winter Soldier." Control circuitry 504 may query a calendar application that contains information about events associated with the user for any event scheduled between Mar. 21, 2017, 08:00:00 AM and Mar. 21, 2017, 09:00:00 AM. Control circuitry 504 may receive a positive query result that indicates that user Sam Jackson has a meeting scheduled to start on Mar. 21, 2017 at 08:45:00 AM.

Process 700 continues to 706 where control circuitry 504 compares the first time with a start time and an end time corresponding to each segment of the plurality of segments. Control circuitry 504 may determine, based on data structure 116, start time and end time of segments that are included in "Captain America: The Winter Soldier." Process 700 continues to 708 where control circuitry 504 determines, based on the comparing, that a segment of the plurality of segments will be interrupted by the event. As an illustrative example, control circuitry 504 may determine that the start of the meeting (e.g., 08:45:00 AM) falls in between the start time and the end time of segment ten, and thus segment ten will be interrupted. Process 700 continues to 710 where control circuitry 504, in response to determining that the segment will be interrupted by the event, modifies the playback of the media asset such that the first time coincides with one of a start time and an end time of the segment. For example, the media guidance application may insert advertisements into the playback of "Captain America: The Winter Soldier" so that playback of segment ten is moved forward to coincide with the event start time of Mar. 21, 2017 at 08:45:00 AM.

Figure 8:
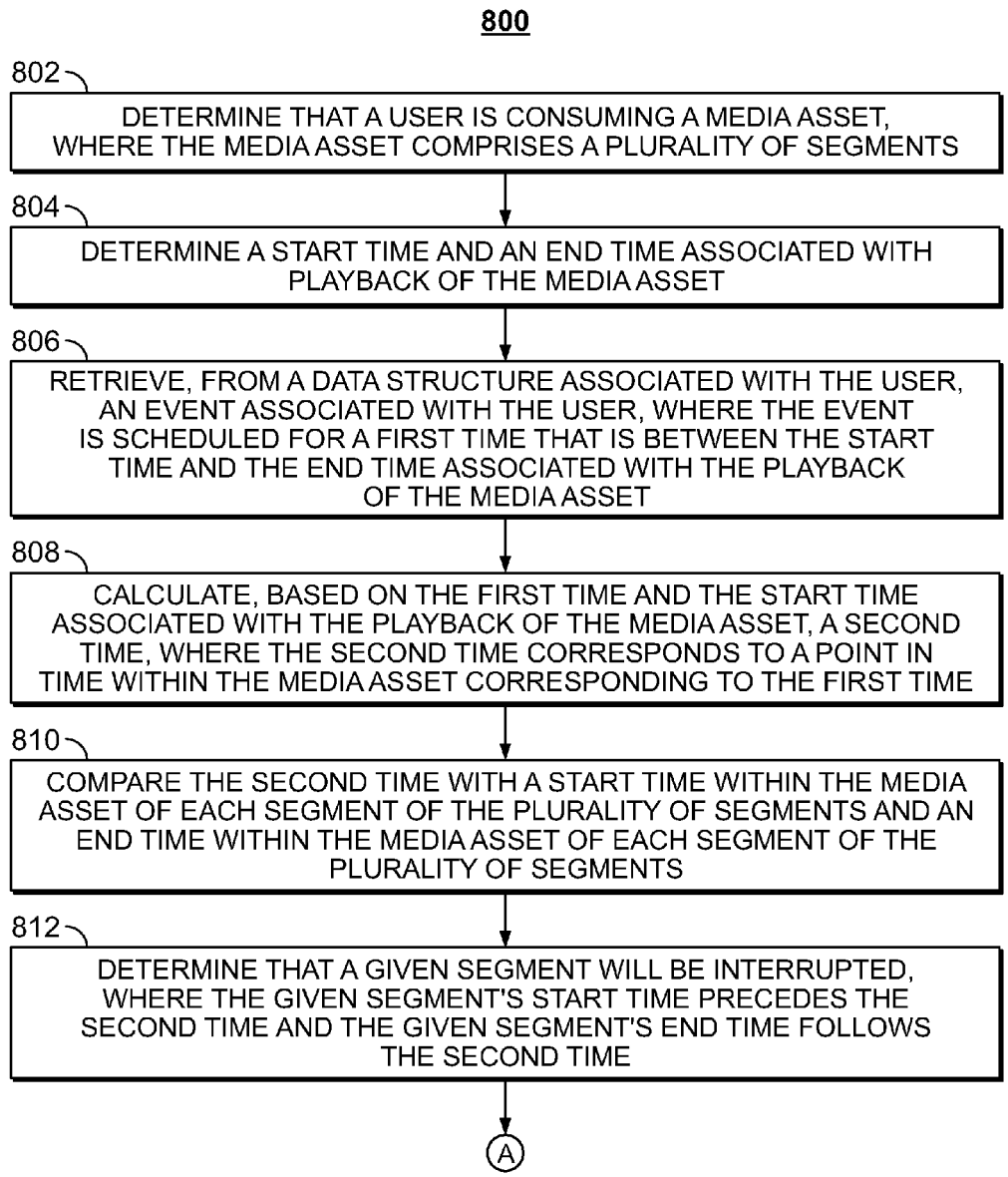
FIG. 8 is another flowchart of illustrative steps involved in modifying playback of a media asset based on an event that will interrupt playback of a given segment within the media asset, in accordance with some embodiments of the disclosure.
Figure 8:
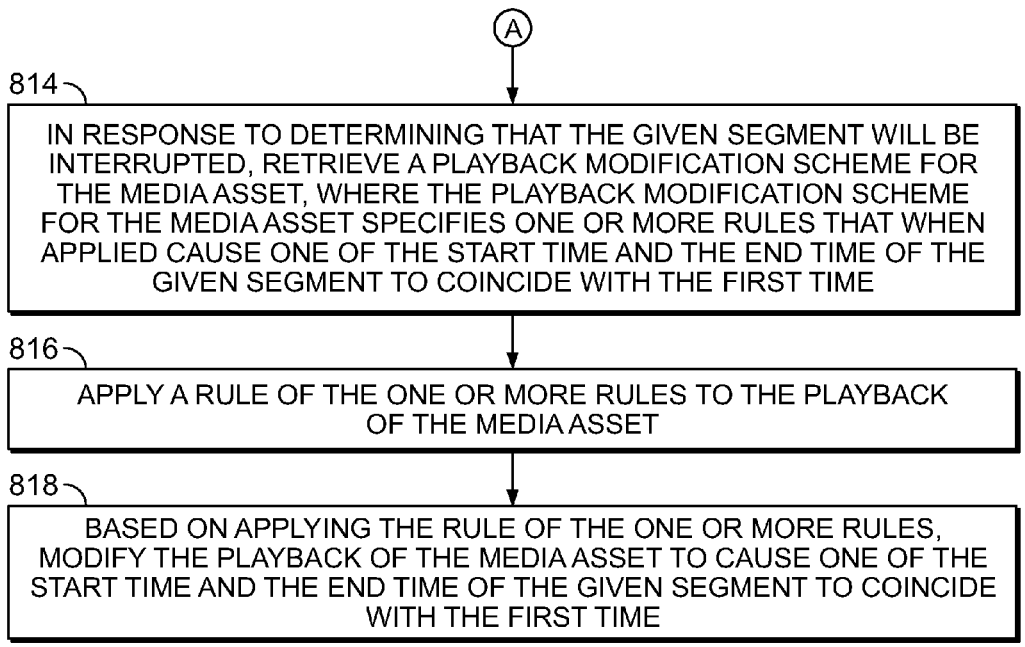

FIG. 8 is another flowchart of illustrative steps involved in modifying playback of a media asset based on an event that will interrupt playback of a given segment within the media asset, in accordance with some embodiments of the disclosure. Process 800 may be executed by control circuitry 504 (FIG. 5) as instructed by the media guidance application. Control circuitry 504 may be implemented on user equipment 602, 604, and/or 606 (FIG. 6). In addition, one or more actions of process 800 may be incorporated into or combined with one or more actions of any other process or embodiment.

Process 800 starts at 802 where control circuitry 504 determines that a user is consuming a media asset, where the media asset comprises a plurality of segments. For example, control circuitry 504 may determine, based on information retrieved from a playback application currently executing on a user device (e.g., any of user television equipment 602, user computer equipment 604 and wireless user communications 606), an identifier for a media asset that the media playback application is currently presenting. As an illustrative example, control circuitry 504 may determine that the media asset currently being consumed is "Captain America: The Winter Soldier." Control circuitry 504 may determine that data structure 116 is associated with "Captain America: The Winter Soldier" and access data structure 116 for more information about "Captain America: The Winter Soldier." Control circuitry 504 may determine that Captain America: The Winter Soldier" includes multiple scenes based on determining that data structure 116 includes multiple entries (e.g., entries 126, 128, 130, 132, 134, 136, 138, 140, 142, 144, 146, and 148), where each entry is associated with a unique segment of "Captain America: The Winter Soldier." Control circuitry 504 may determine the identity of the user consuming the media asset based on a user identifier, received via user input interface 510 or retrieved from any of storage 508, media content source 616 and media guidance source 618.

Process 800 continues to 804 where control circuitry 504 determines a start time and an end time associated with playback of the media asset. For example, control circuitry 504 may access data structure 100, associated with playback of "Captain America: The Winter Soldier," to retrieve values corresponding to media asset playback start time 102 and media asset playback end time 104 (e.g., Mar. 21, 2017, 08:00:00 AM and Mar. 21, 2017, 09:00:00 AM respectively). Process 800 continues to 806 where control circuitry 504 retrieves, from a data structure associated with the user, an event associated with the user, where the event is scheduled for a first time that is between the start time and the end time associated with the playback of the media asset. For example, control circuitry 504 application may access a calendar application, located at any of storage 408, media content source 616 and media guidance data source 618, associated with user Sam Jackson and query for any event scheduled between Mar. 21, 2017, 08:00:00 AM and Mar. 21, 2017, 09:00:00 AM. For example, control circuitry 504 may determine, based on the query results, that Sam Jackson has a meeting scheduled to start on Mar. 21, 2017 at 08:45:00 AM. Control circuitry 504 may generate data structure 108 to store information about the determined interrupting event (e.g., the meeting). Control circuitry 504 may set the value corresponding to event start time 110 to Mar. 21, 2017 at 08:45:00 AM.

Process 800 continues to 808 where control circuitry 504 calculates, based on the first time and the start time associated with the playback of the media asset, a second time, where the second time corresponds to a point in time within the media asset corresponding to the first time. Following from example above, control circuitry 504 may calculate, based on playback start time of "Captain America: The Winter Soldier" (e.g., Mar. 21, 2017, 08:00:00 AM) and the start time of Sam Jackson's meeting (e.g., Mar. 21, 2017 at 08:45:00 AM), that the start time of Sam Jackson's meeting corresponds to a time stamp (00:45:00) within "Captain America: The Winter Soldier." For example, control circuitry 504 may set the value corresponding to a time in the media asset that the event time corresponds (e.g., field 112) to 00:45:00.

Process 800 continues to 810, where control circuitry 504 compares the second time with a start time within the media asset of each segment of the plurality of segments and an end time within the media asset of each segment of the plurality of segments. Control circuitry 504 may determine, based on data structure 116, segment start time and segment end time for each segment in "Captain America: The Winter Soldier." Control circuitry 504 may execute a Boolean comparison function to determine whether the second time falls between the start time and the end time of a segment included in data structure 116.

Process 800 continues to 812, where control circuitry 504 determines that a given segment will be interrupted, where the given segment's start time precedes the second time and the given segment's end time follows the second time. Control circuitry 504 application may determine, based on receiving a "True" result from the Boolean comparison function for segment ten (entry 144), that the start time stamp of segment ten (e.g., 00:42:00) precedes the second time (e.g., 00:45:00) and the end time stamp of segment ten (e.g., 00:49:59) follows the second time (e.g., 00:45:00). Accordingly, control circuitry 504 may determine that segment ten will be interrupted.

Process 800 continues to 814 where control circuitry 504, in response to determining that the given segment will be interrupted, retrieves a playback modification scheme for the media asset, where the playback modification scheme for the media asset specifies one or more rules that when applied cause one of the start time and the end time of the given segment to coincide with the first time. For example, control circuitry 504 may retrieve playback modification scheme data structure 200.

Process 800 continues to 816 where control circuitry 504 applies a rule of the one or more rules to the playback of the media asset. For example, control circuitry 504 may apply rule entry 216 to the playback of "Captain America: The Winter Soldier." Process 800 continues to 818 where control circuitry 504, based on applying the rule of the one or more rules, modifies the playback of the media asset to cause one of the start time and the end time of the given segment to coincide with the first time. For example, based on value corresponding to instruction field 204 of rule entry 216, control circuitry 504 may modify playback of "Captain America: The Winter Soldier" such that the start time of segment ten coincides with the start time of the interrupting meeting.

Figure 9:
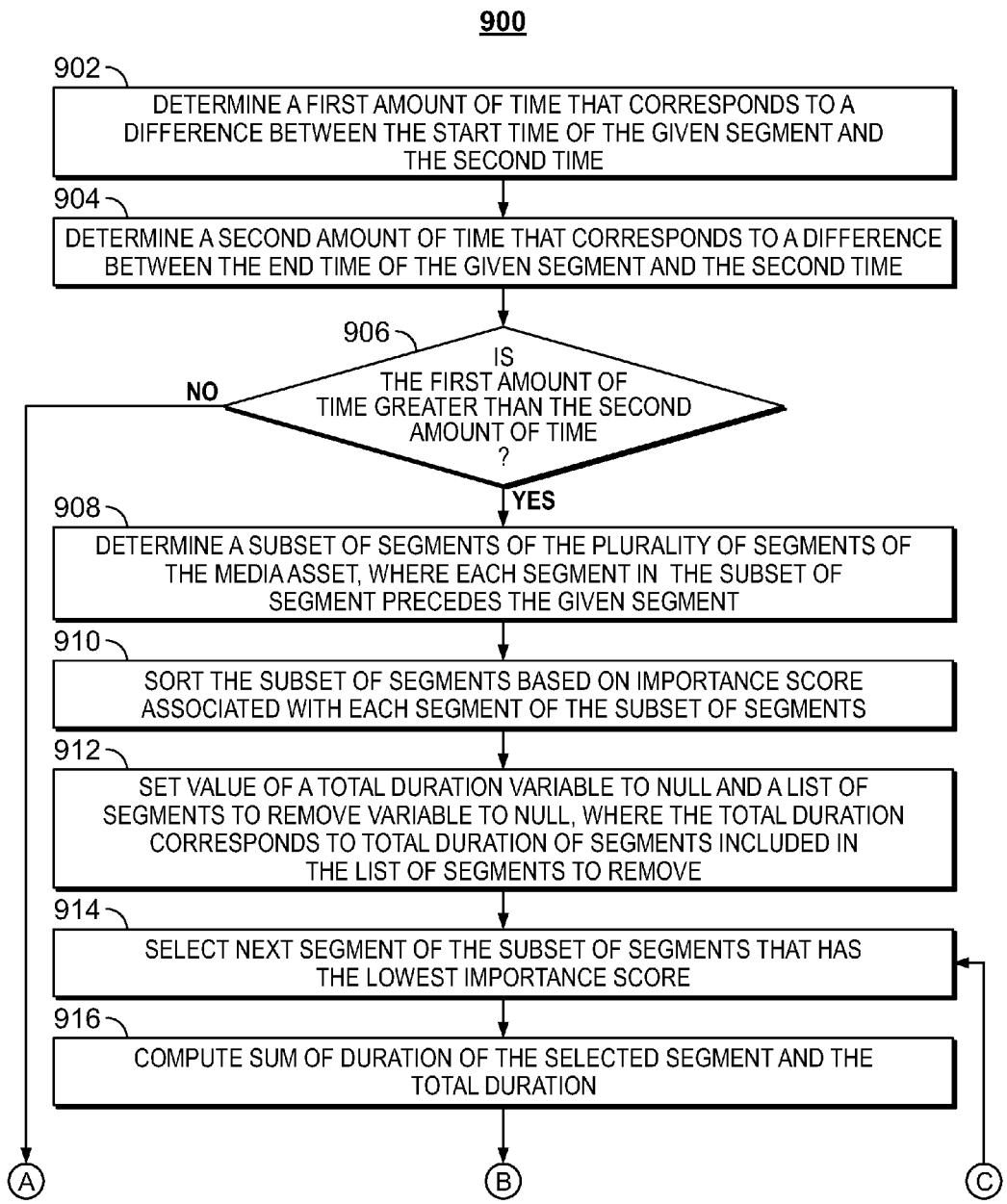
FIG. 9 is another flowchart of illustrative steps involved in modifying playback of a media asset based on whether the interrupting event is closer in time to the start time or the end point of a segment within the media asset that will be interrupted, in accordance with some embodiments of the disclosure.
Figure 9:
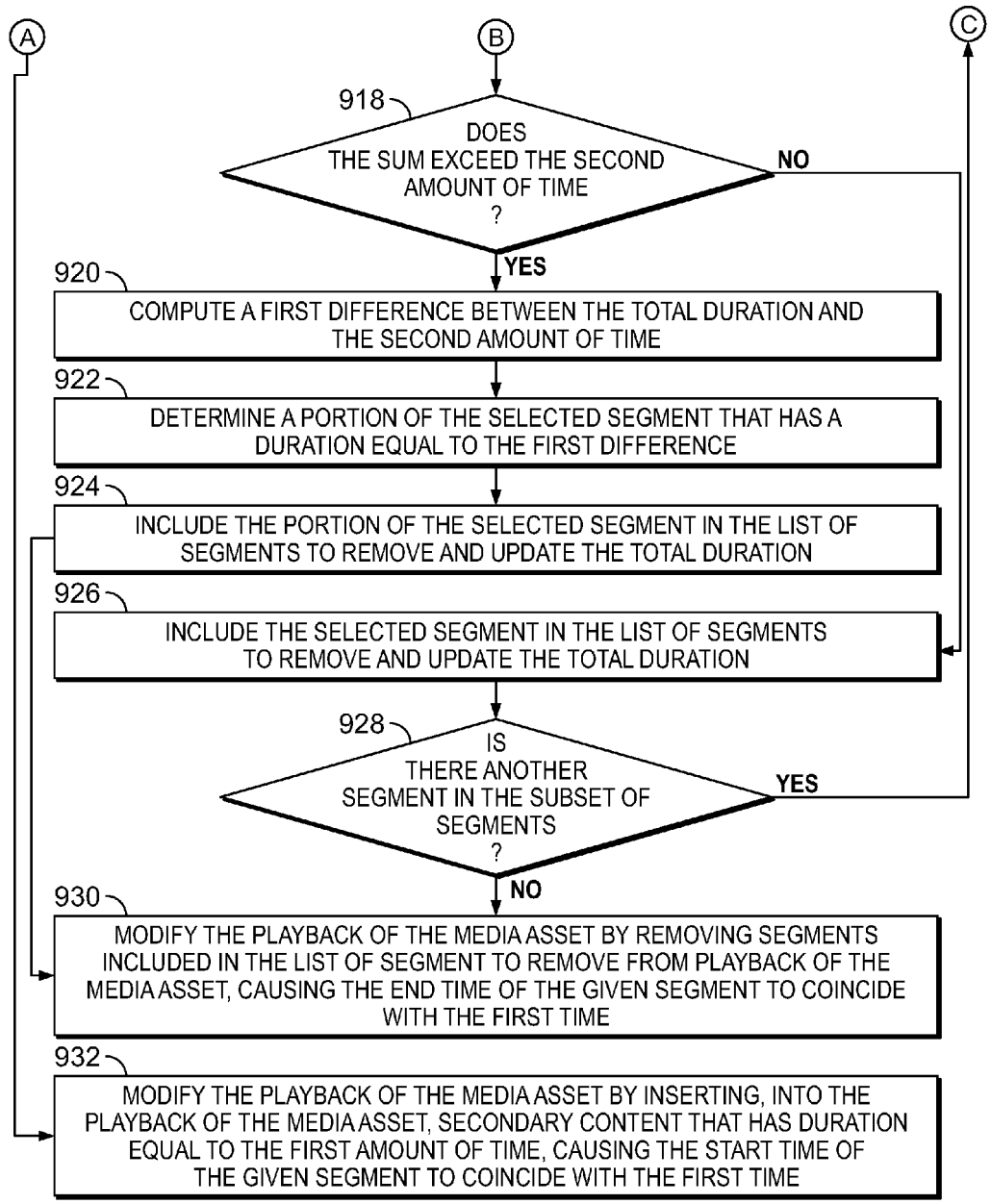

FIG. 9 is another flowchart of illustrative steps involved in modifying playback of a media asset based on whether the interrupting event is closer in time to the start time or the end point of a segment within the media asset that will be interrupted, in accordance with some embodiments of the disclosure. Process 900 may be executed by control circuitry 504 (FIG. 5) as instructed by the media guidance application. Control circuitry 504 may be implemented on user equipment 602, 604, and/or 606 (FIG. 6). In addition, one or more actions of process 900 may be incorporated into or combined with one or more actions of any other process or embodiment.

Control circuitry 504 may execute process 900 when modifying the playback of the media asset based on applying the rule of the one or more rules (step 818 of FIG. 8). Process 900 begins at 902 where control circuitry 504 determines a first amount of time that corresponds to a difference between the start time of the given segment and the second time. As an illustrative example, the second time (i.e., time corresponding to the start time of the interrupting event within the media asset) may be 00:47:00. The segment being interrupted (e.g., segment ten of "Captain America: The Winter Soldier") may have a start time stamp of 00:42:00 and an end time stamp of 00:49:59. Control circuitry 504 may compute the first amount of time to be five minutes. Process 900 continues to 904 to determine a second amount of time that corresponds to a difference between the end time of the given segment and the second time. Following from the example above, control circuitry 504 may compute the second amount of time to be two minutes and fifty-nine seconds. Process 900 continues to 906 where control circuitry 504 determines whether the first amount of time is greater than the second amount of time. For example, control circuitry 504 may execute a Boolean comparison function to determine which amount is greater. If, at 906, control circuitry 504 determines that the first amount of time is not greater than the second amount of time, process 900 continues to 932. At 932, control circuitry 504 modifies the playback of the media asset by inserting, into the playback of the media asset, secondary content that has duration equal to the first amount of time, causing the start time of the given segment to coincide with the first time.

If, at 906, control circuitry 504 determines that the first amount of time is greater than the second amount of time, process 900 continues to 908. Following from the above example, where the first amount of time is five minutes and the second amount of time is two minute and fifty-nine seconds, process 900 may continue to Process 908. At 908, control circuitry 504 determines a subset of segments of the plurality of segments of the media asset, where each segment in the subset of segment precedes the given segment. For example, control circuitry 504 may filter entries in data structure 116 to determine entries that are associated with end times that are prior to the start time segment ten. Process 900 continues to 910, where control circuitry 504 sorts the subset of segments based on an importance score associated with each segment of the subset of segments. For example, control circuitry 504 may use a suitable sorting algorithm (e.g., quick sort, bubble sort, heap sort and other suitable sorting algorithms) to perform the sorting. Process 900 continues to 912 where control circuitry 504 sets the value of a total duration variable to null and a list of segments to remove variable to null, where the total duration corresponds to the total duration of segments included in the list of segments to remove.

Process 900 continues to 914, where control circuitry 504 selects the next segment of the subset of segments that has the lowest importance score. For example, the segment with lowest importance score may be segment one with a duration of one minute and fifty-nine seconds. Process 900 continues to 916 where control circuitry 504 computes the sum of duration of the selected segment and the total duration. For example, sum may be one minute and fifty-nine seconds. Process 900 continues to 918 where control circuitry 504 determines whether the sum exceeds the second amount of time. If, at 918, control circuitry 504 determines that the sum exceeds the second amount of time, process 900 continues to 920. At 920, control circuitry 504 computes a first difference between the total duration and the second amount of time. Process 900 continues to 922, where control circuitry 504 determines a portion of the selected segment that has a duration equal to the first difference. Process 900 continues to 924, where control circuitry 504 includes the portion of the selected segment in the list of segments to remove and update the total duration. Process 900 continues to 930, where control circuitry 504 modifies the playback of the media asset by removing segments included in the list of segments to remove from playback of the media asset, causing the end time of the given segment to coincide with the first time.

If, at 918, control circuitry 504 determines that the sum does not exceed the second amount of time, process 900 continues to 926. Following from the example above, where the sum is one minute fifty-nine seconds and the second amount of time is two minutes fifty-nine seconds, control circuitry 504 continues to 926. At 926, process 900 includes the selected segment in the list of segments to remove and update the total duration. For example, control circuitry 504 includes a pointer to segment one in the list of segments to remove. Process 900 continues to 928 where control circuitry 504 determines whether there another segment in the subset of segments. If, at 928, control circuitry 504 determines that there is another segment in the subset of segments, process 900 reverts to 914. For example, control circuitry 504 may determine that data structure includes additional segments (e.g., segment two) that have not been checked yet and accordingly, process 900 may revert to 914. If, at 928, control circuitry 504 determines that there is no other segment in the subset of segments, process 900 continues to 930 where control circuitry 504 modifies the playback of the media asset by removing segments included in the list of segments to remove from playback of the media asset, causing the end time of the given segment to coincide with the first time.

Figure 10:
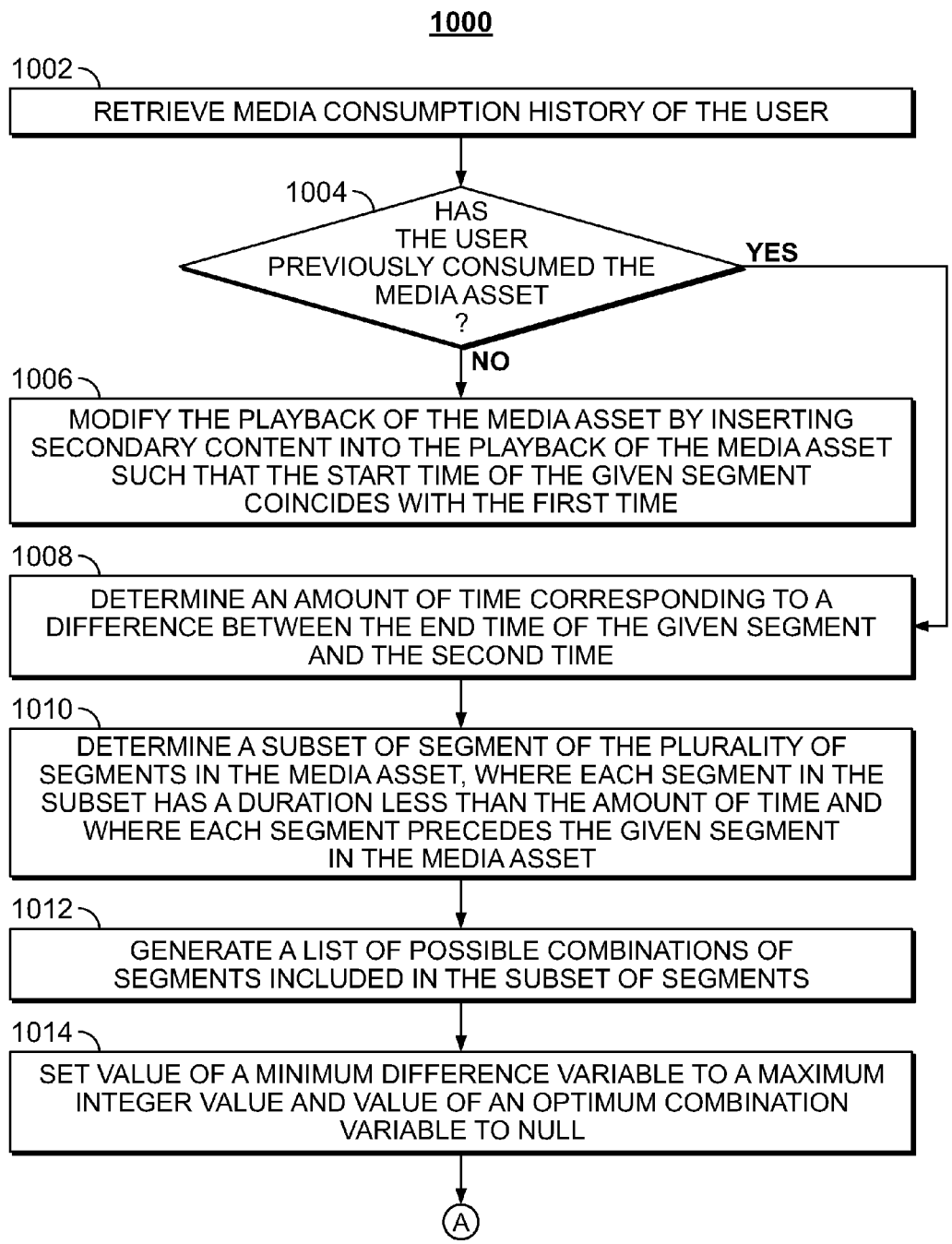
FIG. 10 is a flowchart of illustrative steps involved in modifying playback of a media asset based on the media consumption history of the user, in accordance with some embodiments of the disclosure.
Figure 10:
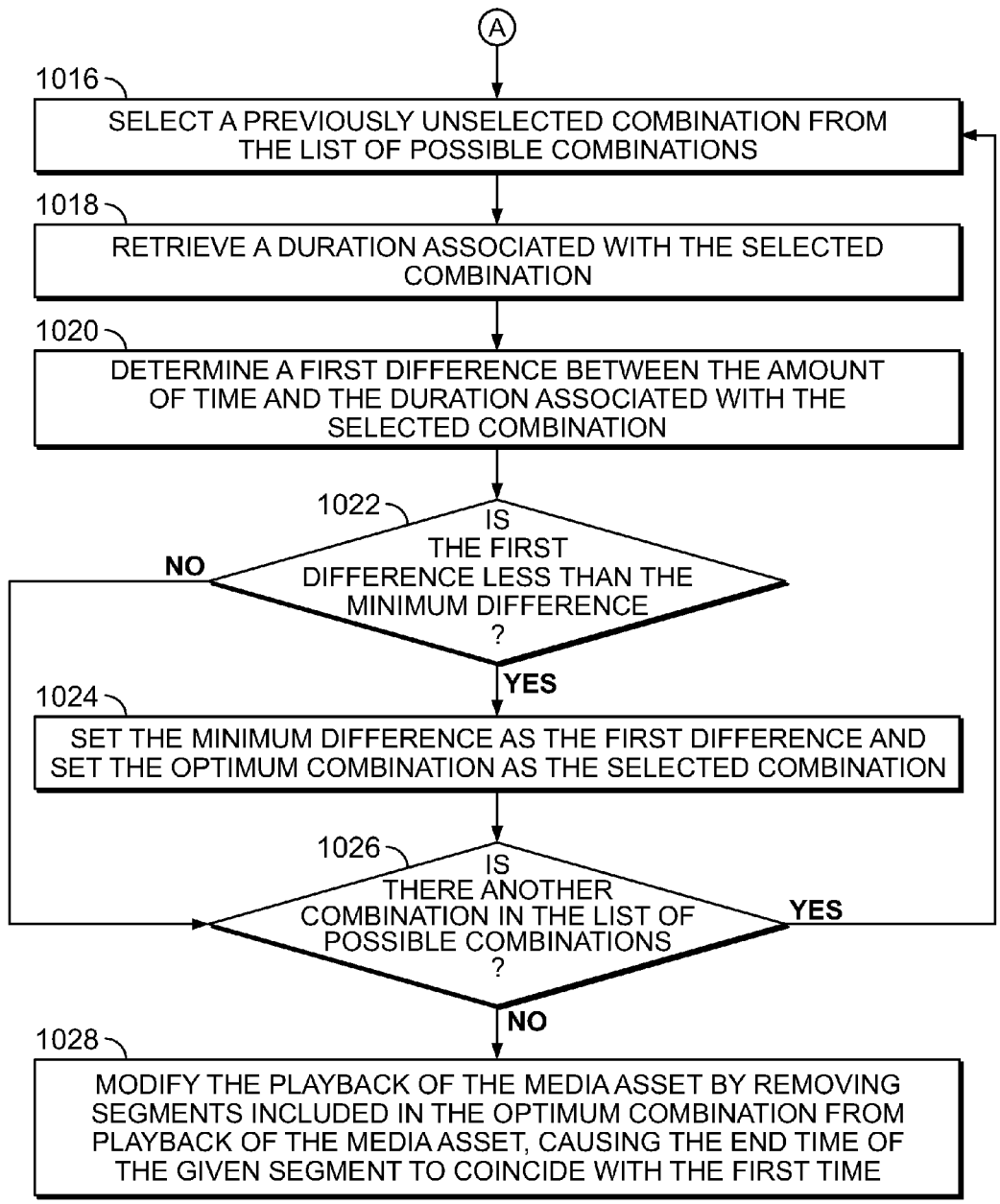

FIG. 10 is a flowchart of illustrative steps involved in modifying playback of a media asset based on media consumption history of the user, in accordance with some embodiments of the disclosure. Process 1000 may be executed by control circuitry 504 (FIG. 5) as instructed by the media guidance application. Control circuitry 504 may be implemented on user equipment 602, 604, and/or 606 (FIG. 6). In addition, one or more actions of process 1000 may be incorporated into or combined with one or more actions of any other process or embodiment.

Control circuitry 504 may execute process 1000 when modifying the playback of the media asset based on applying the rule of the one or more rules (step 818 of FIG. 8). Process 1000 begins at 1002 where control circuitry 504 retrieves media consumption history of the user. For example, control circuitry 504 may retrieve a list of media assets that the user has previously consumed from a user profile of the user. Process 1000 continues to 1004 where control circuitry 504 determines whether the user previously consumed the media asset. For example, control circuitry 504 may query the list of media assets that the user has previously consumed for the media asset currently being consumed. If, at 1004, control circuitry 504 determines that the user has not previously consumed the media asset, process 1000 continues to 1006. For example, control circuitry 504 may receive a null result to the query and continue to 1006. At 1006, control circuitry 504 modifies the playback of the media asset by inserting secondary content into the playback of the media asset such that the start time of the given segment coincides with the first time. If, at 1004, control circuitry 504 determines that the user has previously consumed the media asset, process 1000 continues to 1008. At 1008, control circuitry 504 determines an amount of time corresponding to a difference between the end time of the given segment and the second time. For example, control circuitry 504 may receive a positive query result and continue to 1008. For example, the second time may be 00:45:00 and the end time of the interrupted segment (e.g., segment ten) may be 00:49:59. Accordingly, control circuitry 504 may compute the difference to be four minutes and fifty-nine seconds.

Process 1000 continues to 1010 where control circuitry 504 determines a subset of segment of the plurality of segments in the media asset, where each segment in the subset has a duration less than the amount of time and where each segment precedes the given segment in the media asset. For example, control circuitry 504 may include segments corresponding to entries 126-136 and entries 140 and 142 (i.e., segments one through six, segment eight and segment nine) in the subset. Process 1000 continues to 1012, where control circuitry 504 generates a list of possible combinations of segments included in the subset of segments. Control circuitry 504 may input segments in the subset into a routine to determine the possible combinations. Process 1000 continues to 1014 where control circuitry 504 sets the value of a minimum difference variable to a maximum integer value and the value of an optimum combination variable to null. Control circuitry 504 may store the minimum difference and the optimum combination variables at any of storage 508, media content source 616 and media guidance data source 618.

Process 1000 continues to 1016, where control circuitry 504 selects a combination from the list of possible combinations. As an illustrative example, control circuitry 504 may select a combination comprising segments one, two and three. Process 1000 continues to 1018, where control circuitry 504 retrieves a duration associated with the selected combination. For example, control circuitry 504 may retrieve a duration of four minutes and fifty-nine seconds for the combination comprising segments one, two and three. Process 1000 continues to 1020, where control circuitry 504 determines a first difference between the amount of time and the duration associated with the selected combination. For example, control circuitry 504 may compute the first difference to be zero minutes. Process 1000 continues to 1022, where control circuitry 504 determines whether the first difference is less than the minimum difference. If, at 1022, control circuitry 504 determines that the first difference is less than the minimum difference, process 1000 continues to 1024. At 1024, control circuitry 504 sets the minimum difference as the first difference and sets the optimum combination as the selected combination. For example, control circuitry 504 may update the minimum difference to zero minutes, and the optimum combination with a pointer to the combination comprising segments one, two and three. Process 1000 then continues to 1026.

Process 1000 also continues to 1026, if, at 1022, control circuitry 504 determines that the first difference is not less than the minimum difference. At 1026, control circuitry 504 determines whether there is there another combination in the list of possible combinations. If, at 1026, control circuitry 504 determines that there is another combination in the list of possible combinations, process 1000 reverts to 1016. If, at 1026, control circuitry 504 determines that there is no other combination in the list of Mar. 24, 2017. At 1028, control circuitry 504 modifies the playback of the media asset by removing segments included in the optimum combination from playback of the media asset, causing the end time of the given segment to coincide with the first time. For example, for the case that the best combination is the combination comprising segments one, two and three, control circuitry 504 may remove segments one, two and three from the playback of the media asset.

It is contemplated that the actions or descriptions of FIGS. 7-10 may be used with any other embodiment of this disclosure. In addition, the actions and descriptions described in relation to FIG. 7-10 may be done in alternative orders or in parallel to further the purposes of this disclosure. For example, each of these actions may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for modifying playback of media content, the method comprising:
   determining that a user is consuming a media asset, wherein the media asset comprises a plurality of segments;
   determining a start time and an end time associated with playback of the media asset;
   retrieving, from a data structure associated with the user, an event associated with the user, wherein the event is scheduled for a first time that is between the start time and the end time associated with the playback of the media asset;

calculating, based on the first time and the start time associated with the playback of the media asset, a second time, wherein the second time corresponds to a point in time within the media asset corresponding to the first time;

comparing the second time with a start time within the media asset of each segment of the plurality of segments and an end time within the media asset of each segment of the plurality of segments;

determining that a given segment will be interrupted, wherein the given segment's start time precedes the second time and the given segment's end time follows the second time;

in response to determining that the given segment will be interrupted:

retrieving a playback modification scheme for the media asset, wherein the playback modification scheme for the media asset specifies one or more rules that when applied cause one of the start time and the end time of the given segment to coincide with the first time;

applying a rule of the one or more rules to the playback of the media asset, wherein applying the rule of the one or more rules causes at least one of altering a playback speed of one or more segments of the plurality of segments, removing one or more portions of the one or more segments of the plurality of segments, and inserting secondary content into the media asset; and based on applying the rule of the one or more rules, modifying the playback of the media asset to cause one of the start time and the end time of the given segment to coincide with the first time.

2. The method of claim 1, wherein modifying the playback of the media asset based on applying the rule of the one or more rules comprises:

determining a first amount of time that corresponds to a difference between the start time of the given segment and the second time;

determining a second amount of time corresponding to a difference between the end time of the given segment and the second time;

in response to determining that the first amount of time exceeds the second amount of time, modifying the playback of the media asset by removing one or more segments of the plurality of segments from the playback of the media asset such that the end time of the given segment coincides with the first time; and in response to determining that the second amount of time exceeds the first amount of time, modifying the playback of the media asset by inserting secondary content into the playback of the media asset such that the start time of the given segment coincides with the first time.

3. The method of claim 1, wherein modifying the playback of the media asset based on applying the rule of the one or more rules comprises:

determining, based on media consumption history of the user, whether the user has previously consumed the media asset;

in response to determining that the user has previously consumed the media asset, modifying the playback of the media asset such that the end time of the given segment coincides with the first time; and in response to determining that the user has not previously consumed the media asset, modifying the playback of the media asset such that the start time of the given segment coincides with the first time.

4. The method of claim 1, wherein modifying the playback of the media asset based on applying the rule of the one or more rules comprises:

determining that the media asset is part of a series of media assets;

determining an indicator of engagement of the user in the series of media assets, wherein the indicator of engagement of the user in the series of media assets indicates whether the user is engaged with the series of media assets;

in response to determining, based on the indicator of engagement of the user in the series of media assets, that the user is engaged with the series of media assets, modifying the playback of the media asset such that the end time of the given segment coincides with the first time; and in response to determining, based on the indicator of engagement of the user with the series of media assets, that the user is not engaged in the series of media assets, modifying the playback of the media asset such that the start time of the given segment coincides with the first time.

5. The method of claim 4, further comprising:

determining, based on consumption history data of the user, a number of media assets of series of media assets that the user has previously consumed;

retrieving a threshold engagement number, wherein the threshold engagement number indicates a number of media assets within a series to be consumed by a given user in order for the given user to be classified as being engaged with the series of media assets;

comparing the threshold engagement number with the number of media assets of series of media assets that the user has previously consumed;

in response to determining that the number of media assets of series of media assets that the user has previously consumed exceeds the threshold engagement number, setting the indicator of engagement of the user to indicate that that the user is engaged with the series of media assets; and in response to determining that the number of media assets of series of media assets that the user has previously consumed is less than the threshold engagement number, setting the indicator of engagement of the user to indicate that the user is not engaged with the series of media assets.

6. The method of claim 1, wherein retrieving, from the data structure associated with the user, the event associated with the user comprises:

determining, based on data retrieved from a navigation application, that the user is travelling to a destination while consuming the media asset;

retrieving, from the data retrieved from the navigation application, an arrival time, wherein the arrival time corresponds to a time when the destination will be reached;

determining, based on comparing the arrival time with the start time and the end time associated with the playback of the media asset, that the arrival time is between the start time and the end time associated with the playback of the media asset; and setting the arrival time as the first time.

7. The method of claim 1, wherein retrieving, from the data structure associated with the user, the event associated with the user comprises:

retrieving user activity data;

determining, based on the user activity data, whether there exists a habitual user activity associated with a specific time of day, wherein the habitual user activity corresponds to an activity that the user has performed at the specific time of day at least a threshold number of times within a pre-defined period of time;

in response to determining that the habitual user activity exists, retrieving the specific time of day; and determining, based on comparing the specific time of day with the start time and the end time associated with the playback of the media asset, that the specific time of day is between the start time and the end time associated with the playback of the media asset; and setting the specific time of day as the first time.

8. The method of claim 1, wherein modifying the playback of the media asset to cause one of the start time and the end time of the given segment to coincide with the first time comprises:

retrieving an importance score associated with a first segment, wherein the importance score is an indicator of how important the first segment is to the media asset;

retrieving a threshold importance score;

determining, based on comparing the importance score of the given segment with the threshold importance score, that the importance score of the first segment is less than the threshold importance score;

in response to determining that the importance score of the first segment is less than the threshold importance score, selecting the first segment for removal from the playback of the media asset.

9. The method of claim 1, wherein applying the rule of the one or more rules to the playback of the media asset further comprises:

determining that the playback modification scheme comprises a first rule and a second rule, wherein the first rule and the second rule if applied will create a conflict;

retrieving a first priority level associated with the first rule and a second priority level associated with the second rule;

determining that the first priority level is greater than the second priority level; and in response to determining that the first priority level is greater than the second priority level, applying the first rule and refraining from applying the second rule.

10. The method of claim 9, further comprising:

retrieving a first criterion associated with the first rule, and a second criterion associated with the second rule;

determining that the first criterion is related to the user, and the second criterion is related to the media asset; and assigning the first priority to the first rule and the second priority to the second rule.

11. A system for modifying playback of media content, the system comprising:

storage; and control circuitry configured to:

determine that a user is consuming a media asset, wherein the media asset comprises a plurality of segments;

determine a start time and an end time associated with playback of the media asset;

retrieve an event associated with the user, from a data structure that is associated with the user and is stored in the storage, wherein the event is scheduled for a first time that is between the start time and the end time associated with the playback of the media asset;

calculate, based on the first time and the start time associated with the playback of the media asset, a second time, wherein the second time corresponds to a point in time within the media asset corresponding to the first time;

compare the second time with a start time within the media asset of each segment of the plurality of segments and an end time within the media asset of each segment of the plurality of segments;

determine that a given segment will be interrupted, wherein the given segment's start time precedes the second time and the given segment's end time follows the second time;

in response to determining that the given segment will be interrupted:

retrieve a playback modification scheme for the media asset, wherein the playback modification scheme for the media asset specifies one or more rules that when applied cause one of the start time and the end time of the given segment to coincide with the first time;

apply a rule of the one or more rules to the playback of the media asset, wherein applying the rule of the one or more rules causes at least one of altering a playback speed of one or more segments of the plurality of segments, removing one or more portions of the one or more segments of the plurality of segments, and inserting secondary content into the media asset; and based on applying the rule of the one or more rules, modify the playback of the media asset to cause one of the start time and the end time of the given segment to coincide with the first time.

12. The system of claim 11, wherein the control circuitry is configured, when modifying the playback of the media asset based on applying the rule of the one or more rules, to:

determine a first amount of time that corresponds to a difference between the start time of the given segment and the second time;

determine a second amount of time corresponding to a difference between the end time of the given segment and the second time;

in response to determining that the first amount of time exceeds the second amount of time, modify the playback of the media asset by removing one or more segments of the plurality of segments from the playback of the media asset such that the end time of the given segment coincides with the first time; and in response to determining that the second amount of time exceeds the first amount of time, modify the playback of the media asset by inserting secondary content into the playback of the media asset such that the start time of the given segment coincides with the first time.

13. The system of claim 11, wherein the control circuitry is configured, when modifying the playback of the media asset based on applying the rule of the one or more rules, to:

determine, based on media consumption history of the user, whether the user has previously consumed the media asset;

in response to determining that the user has previously consumed the media asset, modify the playback of the media asset such that the end time of the given segment coincides with the first time; and in response to determining that the user has not previously consumed the media asset, modify the playback of the media asset such that the start time of the given segment coincides with the first time.

14. The system of claim 11, wherein the control circuitry is configured, when modifying the playback of the media asset based on applying the rule of the one or more rules, to:

determine that the media asset is part of a series of media assets;

determine an indicator of engagement of the user in the series of media assets, wherein the indicator of engagement of the user in the series of media assets indicates whether the user is engaged with the series of media assets;

in response to determining, based on the indicator of engagement of the user in the series of media assets, that the user is engaged with the series of media assets, modify the playback of the media asset such that the end time of the given segment coincides with the first time; and in response to determining, based on the indicator of engagement of the user with the series of media assets, that the user is not engaged in the series of media assets, modify the playback of the media asset such that the start time of the given segment coincides with the first time.

15. The system of claim 14, wherein the control circuitry is further configured to:

determine, based on consumption history data of the user, a number of media assets of series of media assets that the user has previously consumed;

retrieve a threshold engagement number, wherein the threshold engagement number indicates a number of media assets within a series to be consumed by a given user in order for the given user to be classified as being engaged with the series of media assets;

compare the threshold engagement number with the number of media assets of series of media assets that the user has previously consumed;

in response to determining that the number of media assets of series of media assets that the user has previously consumed exceeds the threshold engagement number, set the indicator of engagement of the user to indicate that that the user is engaged with the series of media assets; and in response to determining that the number of media assets of series of media assets that the user has previously consumed is less than the threshold engagement number, set the indicator of engagement of the user to indicate that the user is not engaged with the series of media assets.

16. The system of claim 11, wherein the control circuitry is configured, when retrieving, from the data structure associated with the user, the event associated with the user, to:

determine, based on data retrieved from a navigation application, that the user is travelling to a destination while consuming the media asset;

retrieve, from the data retrieved from the navigation application, an arrival time, wherein the arrival time corresponds to a time when the destination will be reached;

determine, based on comparing the arrival time with the start time and the end time associated with the playback of the media asset, that the arrival time is between the start time and the end time associated with the playback of the media asset; and set the arrival time as the first time.

17. The system of claim 11, wherein the control circuitry is configured, when retrieving, from the data structure associated with the user, the event associated with the user, to:

retrieve user activity data;

determine, based on the user activity data, whether there exists a habitual user activity associated with a specific time of day, wherein the habitual user activity corresponds to an activity that the user has performed at the specific time of day at least a threshold number of times within a pre-defined period of time; in response to determining that the habitual user activity exists, retrieve the specific time of day; and determine, based on comparing the specific time of day with the start time and the end time associated with the playback of the media asset, that the specific time of day is between the start time and the end time associated with the playback of the media asset; and set the specific time of day as the first time.

18. The system of claim 11, wherein the control circuitry is configured, when modifying the playback of the media asset to cause one of the start time and the end time of the given segment to coincide with the first time, to:

retrieve an importance score associated with a first segment, wherein the importance score is an indicator of how important the first segment is to the media asset;

retrieve a threshold importance score;

determine, based on comparing the importance score of the given segment with the threshold importance score, that the importance score of the first segment is less than the threshold importance score;

in response to determining that the importance score of the first segment is less than the threshold importance score, select the first segment for removal from the playback of the media asset.

19. The system of claim 11, wherein the control circuitry is configured, when applying the rule of the one or more rules to the playback of the media asset, to:

determine that the playback modification scheme comprises a first rule and a second rule, wherein the first rule and the second rule if applied will create a conflict;

retrieve a first priority level associated with the first rule and a second priority level associated with the second rule;

determine that the first priority level is greater than the second priority level; and in response to determining that the first priority level is greater than the second priority level, apply the first rule and refrain from applying the second rule.

20. The system of claim 19, wherein the control circuitry is further configured to:

retrieve a first criterion associated with the first rule, and a second criterion associated with the second rule;

determine that the first criterion is related to the user, and the second criterion is related to the media asset;

assign the first priority to the first rule and the second priority to the second rule.

* * * * *